United States Patent
Kikuchi

(10) Patent No.: US 8,341,463 B2
(45) Date of Patent: Dec. 25, 2012

(54) SYSTEM OPERATIONS MANAGEMENT APPARATUS, SYSTEM OPERATIONS MANAGEMENT METHOD

(75) Inventor: Shinji Kikuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/885,694

(22) Filed: Sep. 20, 2010

(65) Prior Publication Data

US 2011/0010587 A1 Jan. 13, 2011

Related U.S. Application Data

(63) Continuation of application No. PCT/JP2008/056143, filed on Mar. 28, 2008.

(51) Int. Cl.
*G06F 11/00* (2006.01)

(52) U.S. Cl. ............. 714/37; 714/49; 709/223; 709/224

(58) Field of Classification Search .................. 714/21, 714/37, 49; 709/223, 224
See application file for complete search history.

(56) References Cited

U.S. PATENT DOCUMENTS

| | | | |
|---|---|---|---|
| 7,640,245 B1 * | 12/2009 | Abdo et al. ........................... | 1/1 |
| 2003/0069960 A1 * | 4/2003 | Symons et al. ............. | 709/224 |
| 2005/0254438 A1 * | 11/2005 | Turk et al. ..................... | 370/254 |
| 2006/0104220 A1 * | 5/2006 | Yamazaki et al. ........... | 370/254 |
| 2007/0058570 A1 * | 3/2007 | Singh et al. ................... | 370/254 |
| 2008/0028048 A1 * | 1/2008 | Shekar CS et al. ........... | 709/220 |
| 2010/0195537 A1 * | 8/2010 | Pelletier et al. ............... | 370/255 |
| 2010/0223499 A1 * | 9/2010 | Panigrahy et al. .............. | 714/19 |
| 2011/0055636 A1 * | 3/2011 | DeHaan et al. ................. | 714/37 |

FOREIGN PATENT DOCUMENTS

| | | |
|---|---|---|
| JP | 11-065639 | 3/1999 |
| JP | 2003-168102 | 6/2003 |
| JP | 2004-038535 | 2/2004 |
| JP | 2006-178626 | 7/2006 |
| JP | 2007-087232 | 4/2007 |

OTHER PUBLICATIONS

A. Brown, "A Recovery-Oriented Approach to Dependable Services: Repairing Past Errors with System-Wide Undo," UC Berkeley Computer Science Division Technical Report, Dec. 2003; pp. 1-188.
Mark Brodie, et al., Quickly Finding Known Software Problems via Automated Symptom Matching, Proc. of ICAC '05, 2005; pp. 1-10.

(Continued)

*Primary Examiner* — Philip Guyton
(74) *Attorney, Agent, or Firm* — Greer, Burns & Crain, Ltd.

(57) ABSTRACT

A system management procedure combines operations for performing operation management in a computer system, the system management knowledge capable of specifying a post-status of each constituent element of the computer system, the post-status being expected as a result that the operations are executed in accordance with the system management procedure, are previously stored in databases. Then, it is judged that a failure occurs, when an actual state of the computer system as a result that the operations are executed based on the system management procedure, is inconsistent with the expected post-status. When the failure occurred, a revising method capable of making the actual state of the computer system as the result that the operations are executed in the system management procedure, to be consistent with the expected post-status, is derived to be proposed.

15 Claims, 9 Drawing Sheets

OTHER PUBLICATIONS

K. E. Maghraoui, et al., "Model Driven Provisioning: Bridging the Gap Between Declarative Object Models and Procedural Provisioning Tools," Proc. of Middleware 2006, 2006; pp. 1-20.

A. Brown, et al., "A Model of Configuration Complexity and its Application to a Change Managemait System," Proc. of IM2005, 2005; pp. 1-14.

A. Keller, et al., "The CHAMPS System: Change Management with Planning and Scheduling," Proc. of the 9th IEEE/IFIP Network Operations and Management Symposium; Seoul, Korea, Apr. 2004; pp. 1-14.

A. Brown, et al., "A Best Practice Approach for Automating IT Management Processes;" Proc. of NOMS2006, 2006; pp. 24-35.

T. Eilam, et al., "Managing the Configuration Complexity of Distributed Applications in Internet Data Centers," IEEE Communications Magazine, Mar. 2006; pp. 166-177.

Kiyoshi Kato, "A study of the Priority Optimization for Policy-Based Self-Managing System"; Information Processing Society 66th National Convention; Mar. 9, 2004; pp. 1-7.

International Preliminary Report on Patentability (Chapter 1 of the Patent Cooperation Treaty), with English language translation, for PCT/JP2008/056143, mailed Oct. 7, 2010.

\* cited by examiner

FIG. 5

KNOWLEDGE

SYSTEM MANAGEMENT PROCEDURE

... → ☐ → $\alpha$ → ☐ → ...

OPERATION $\alpha$

PRE-CONDITION : $\neg Post \wedge Pre$
POST-CONDITION : $Post$

⇩ REVISE

ALTERNATIVE SYSTEM MANAGEMENT PROCEDURE

→ ☐ → ⌇RESOLUTION UNNOTICED⌇ → ⌇RESOLUTION FACTOR⌇ → $\alpha$ → ☐ →

ALTERNATIVE OPERATION $\alpha'$

PRE-CONDITION : $\neg Post \wedge Pre \wedge Unnoticed \wedge Factor$
POST-CONDITION : $Post$

FIG. 7A

|  |  | EXPECTED STATUS | | | |
|---|---|---|---|---|---|
|  |  | $e_{cfgDB}^{Pre}$ | $e_{cfgDB}^{Post}$ | $e_{rbtDB}^{Pre}$ | $e_{rbtDB}^{Post}$ |
| PROPOSITION (PREDICATE) | CHANGED(DBcfg) | F | T | T | T |
|  | UPDATED(DB) | - | - | F | T |
|  | CHECKED(DBcfg) | - | - | - | T |
|  | ENOUGHCAPACITY (DB) | F | F | F | T |
|  | ENOUGHCAPACITY (NW) | T | T | T | T |
|  | UPDATED(NW) | - | - | - | - |
|  | SATISFIED(SLA) | F | F | F | T |

FIG. 7B

|  |  | ACTUAL STATUS | | | |
|---|---|---|---|---|---|
|  |  | $e_{cfgDB}^{Pre}$ | $e_{cfgDB}^{Post}$ | $e_{rbtDB}^{Pre}$ | $e_{rbtDB}^{Post}$ |
| PROPOSITION (PREDICATE) | CHANGED(DBcfg) | F | T | T | T |
|  | UPDATED(DB) | F | F | F | F |
|  | CHECKED(DBcfg) | F | F | F | F |
|  | ENOUGHCAPACITY (DB) | F | F | F | F |
|  | ENOUGHCAPACITY (NW) | T | T | T | T |
|  | UPDATED(NW) | F | F | F | F |
|  | SATISFIED(SLA) | F | F | F | F |

FIG. 8A

| | EXPECTED STATUS | | | | | |
|---|---|---|---|---|---|---|
| | $e_{cfgDB}^{Pre}$ | $e_{cfgDB}^{Post}$ | $e_{chkDB}^{Pre}$ | $e_{chkDB}^{Post}$ | $e_{rbtDB}^{Pre}$ | $e_{rbtDB}^{Post}$ |
| CHANGED(DBcfg) | F | T | T | T | T | T |
| UPDATED(DB) | - | - | - | - | F | T |
| CHECKED(DBcfg) | - | - | - | T | T | T |
| ENOUGHCAPACITY (DB) | F | F | F | F | F | T |
| ENOUGHCAPACITY (NW) | T | T | T | T | T | T |
| UPDATED(NW) | - | - | - | - | - | - |
| SATISFIED(SLA) | F | F | F | F | F | T |

(PROPOSITION (PREDICATE))

FIG. 8B

| | ACTUAL STATUS | | | | | |
|---|---|---|---|---|---|---|
| | $e_{cfgDB}^{Pre}$ | $e_{cfgDB}^{Post}$ | $e_{chkDB}^{Pre}$ | $e_{chkDB}^{Post}$ | $e_{rbtDB}^{Pre}$ | $e_{rbtDB}^{Post}$ |
| CHANGED(DBcfg) | F | T | T | T | T | T |
| UPDATED(DB) | F | F | F | F | F | T |
| CHECKED(DBcfg) | F | F | F | T | T | T |
| ENOUGHCAPACITY (DB) | F | F | F | F | F | T |
| ENOUGHCAPACITY (NW) | T | T | T | T | T | F |
| UPDATED(NW) | F | F | F | F | F | F |
| SATISFIED(SLA) | F | F | F | F | F | F |

(PROPOSITION (PREDICATE))

SYSTEM OPERATIONS MANAGEMENT APPARATUS, SYSTEM OPERATIONS MANAGEMENT METHOD

CROSS REFERENCES TO RELATED APPLICATIONS

This application is a continuation of an international application PCT/JP2008/056143, which was filed on Mar. 28, 2008, the entire contents of which are incorporated herein by reference.

FIELD

The embodiments discussed herein relate to an operations management technology for a computer system.

BACKGROUND

In recent years, with the provision of various services, computer systems have taken a large role in society, and such systems have been large-scale and complicated. Furthermore, it is very difficult to manually manage such a complicated system, and thus, there is no end to system failures caused by operations in the operations management. For example, there is a report that 75% of system downtime is caused by manual operations (refer to "A. Brown, "*A Recovery-Oriented Approach to Dependable Services: Repairing Past Errors with System-Wide Undo*", UC Berkeley Computer Science Division Technical Report, 2003"). Therefore, for the purpose of decreasing such operational errors, there has been adopted an approach in which a system management procedure made by combining operations for performing operations management is previously defined in the system, so that the operations management is performed in accordance with this system management procedure.

A configuration of the computer system is frequently modified in order to enhance resources or security. Therefore, the system management procedure defined in the system needs to be revised so as to be consistent with the modification of the system configuration. Otherwise, the operations are performed in accordance with the unrevised system management procedure, and as a result, there is a possibility that failures will occur due to inconsistency with an actual status of the system. In order that a manager can easily revise the system management procedure so as to be consistent with the modification of the system configuration, there has been proposed a technology for providing information indicating the cause of the influence and the degree thereof (refer to "Japanese Laid-open (Kokai) Patent Application Publication No. 2007-87232"), in the case in which the system management procedure exerts some influence due to modification of the system configuration.

However, even if the information indicating the cause of the influence and degree thereof due to the modification of the system configuration on the system management procedure is provided to the manager, in practice, the manager who referred to the information may not properly revise the system management procedure. That is, due to system complexity in recent years, if a certain constituent element in the system is modified, an influence due to this modification of the system management procedure may be widely exerted not only on the modified constituent element but also on the remaining constituent elements. On the other hand, individual constituent elements themselves in the system, for example, a database server, a network and the like, become complicated using high technology. Therefore, it is required for a domain expert who is the manager of each of these constituent elements to have a high degree of knowledge specific to the expert's assigned domain. However, a manager tends to have little knowledge in domains except for the manager's assigned domain. In such a situation, even if the manager refers to the information indicating the cause and the like of the influence on the system management procedure due to the modification of the system configuration, it is difficult for the manager to judge correctly how the system management procedures are to be revised in cases in which such an influence is exerted on system management procedures of the remaining constituent elements in the domains other than the manager's assigned domain.

Furthermore, since the system is complicated as described above, there is also a possibility that, as a result of the system management procedure being revised to execute new operations, further remaining constituent elements are affected. However, the manager has little knowledge relating to the constituent elements in the domains except for the manager's assigned domain, and therefore, it is difficult for the manager to revise the system management procedure while correctly predicting such a possibility.

Thus, it was difficult for a manager to properly revise the system management procedure so as to be consistent with the actual status of the system. Therefore, it was difficult to prevent a failure which may occur when the operations are executed in accordance with the system management procedure. Furthermore, also in the case in which the failure practically occurred, it was also difficult for the manager to properly revise the system management procedure. In fact, it has been reported that most failures had already occurred in the past (refer to Mark Brodie, et al., "*Quickly Finding Known Software Problems via Automated Symptom Matching*", Proc. of ICAC' 05, 2005). This is because experiences obtained from the failures occurred in the past are not properly reflected in the operations management.

SUMMARY

According to an aspect of the present invention, a system management procedure made up by combining operations for performing operations management on a computer system, and a system management knowledge capable of specifying at least a post-condition of each constituent element of the computer system, which is expected as a result of execution of the operations in accordance with the system management procedure, are previously stored in databases. Then, when an actual status of the computer system as a result of the execution of operations based on the system management procedure differs from the expected post-condition, it is judged that a failure occurs. Furthermore, when the failure occurs, operations capable of making the actual status of the computer system as a result of the execution of operations in the system management procedure to be consistent with the post-condition are derived. Then, derived operations are proposed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a conceptual diagram illustrating a flow for revising a system management procedure and operation knowledge;

FIG. 7 is an explanatory diagram illustrating a system status in the case of an unachieved post-condition, in which (A) illustrates an expected status, and (B) illustrates an actual status after execution of operations;

FIG. 8 is an explanatory diagram illustrating the system status in the case of unexpected side effect, in which (A) illustrates an expected state, and (B) illustrates an actual status after execution of operations.

DETAILED DESCRIPTION OF THE PREFERRED EMBODIMENTS

Hereinafter, the present embodiment will be explained in detail, with reference to accompanying drawings.

1. Problems in System Operations Management

Firstly, there will be described problems in operations management of a system, which provides a background in which the present embodiment is to be applied. Herein, one case example is cited, and also, problems thereof will be formulated to be explained.

1-1 Overview of Case Example of System Modification

Figure 1:
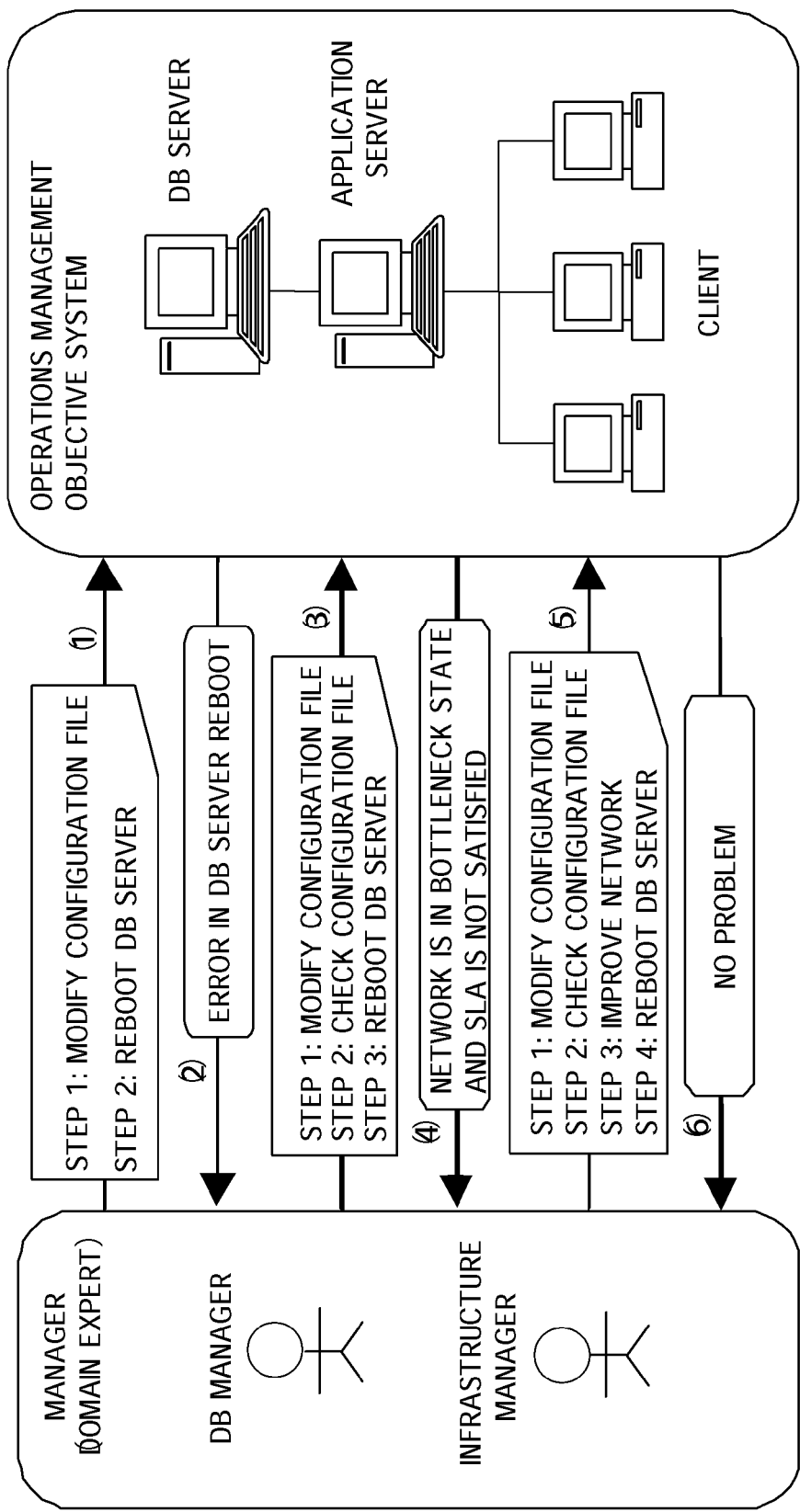
FIG. 1 is a conceptual diagram of a case example of system configuration modification.

FIG. 1 illustrates one case example in which a system configuration is modified in operations management of a business system in a company. An operations management objective system in this case example includes an application server, a database (to be referred to as "DB" hereunder) server, clients and an infrastructure connecting them to one another. Hereinafter, a situation will be described in which performance of the DB server is in a bottleneck, and therefore, a service level (Service Level Agreement: to be referred to as "SLA" hereunder) which is to be satisfied, is not yet achieved in such a system, and then the SLA is improved by tuning the DB server.

It is provided that, at this time, in order to improve the performance of the DB server to thereby solve the problems, a manager of the DB server sets the following system management procedure and executes it (1).

Step 1: modify a configuration file of the DB server
Step 2: reboot the DB server However, it is provided that, when the configuration file is modified by the manager in step 1, a grammatical error occurs in modified contents. In this case, even if the DB server is reset in Step 2 described above, the DB server may not be rebooted (2). At this time, the system management procedure is to be revised as follows (3).

(Revision 1)
Step 1: modify the configuration file of the DB server
Step 2: perform grammatical check of the configuration file [added]
Step 3: reboot the DB server If the system management procedure is changed as described above, the DB server is successfully rebooted, and the performance of the DB server is improved.

However, it is provided that, as a result that the performance of the DB server has been improved, user requests are increased, and therefore, a network becomes overloaded. In this condition, in place of the DB server, the network becomes in a bottleneck, and therefore, defined SLA may not be satisfied (4). Therefore, the system management procedure needs to be further revised as follows (5).

(Revision 2)
Step 1: modify the configuration file of the DB server
Step 2: perform grammatical check on the configuration file
Step 3: enhance a band of the network [added]
Step 4: reboot the DB server If the system management procedure is revised as described above, the system is finally operated with no problem (6).

However, it is difficult for the manager to predict these failures from the beginning, and therefore, it is difficult to define a proper system management procedure. In particular, for problems relating to constituent elements outside an assigned domain of a domain expert being the manager, even after the failures occur, it is difficult to specify causes thereof, and accordingly, it is difficult to properly revise the system management procedure.

Furthermore, in order to prevent an occurrence of a failure similar to the failure that has once occurred, it is necessary to focus on operations included in the system management procedure, and revise the remaining system management procedures including those operations. For example, in the case example of clause 1-1, the remaining system management procedures, each of which includes an operation performing the reboot of the DB server, are to be subjected to similar revisions. That is, if the configuration file of the DB server is modified, the revision is to be performed so that the reboot of the DB server is performed only after the configuration file is checked. However, previously, the manager has only revised the individual system management procedures without feedback, and thus, systematic improvement in the overall system has not been performed.

Incidentally, in this case example, the operations management of the business system in the company is cited. However, the operations management objective system to which the present invention is applied is not limited to the above-mentioned configuration.

1-2 Formulation of the Problems Caused by System Modification

As in the case example of clause 1-1, in the operations management of the system, if problems are caused when the system is modified by performing any works, such problems can be classified into two main types: "(A) unachieved post-condition" or "(B) unexpected side effect".

"(A) The unachieved post-condition" indicates the case in which, even if the system were modified, a portion to be modified was not modified as expected. For example, in the case example of clause 1-1, the manager considered that the update of DB would be completed if the configuration file were modified and the DB server were rebooted. However, practically, since the configuration file was not checked by the manager when the configuration file was modified, a grammatical error was overlooked, and accordingly, the DB server was not rebooted. Therefore, the expected DB update was not completed. Such a problem tends to be caused when the manager performs the modification work while not understanding correctly the necessary preparation in advance and preconditions to be satisfied.

"(B) The unexpected side effect" indicates the case in which, although an expected modification result was obtained as a result of operations, an unexpected undesirable change was further caused. For example, in the case example of clause 1-1, as a result that the setting of the DB server in the bottleneck was modified in order to improve the system performance, there was caused an unexpected phenomenon in which the user requests were increased. Then, in turn, there is caused situation in which the network becomes in the bottleneck. This problem tends to be caused when the manager performs the modification work while not supposing correctly an influence range of the modification to be performed on the system. Then, as described in the above, this problem is caused by the fact that the domain expert being the manager is determined for each constituent element making up the system, and the domain expert does not understand correctly an influence of the operations performed on the system, on the remaining constituent elements.

Figure 2:
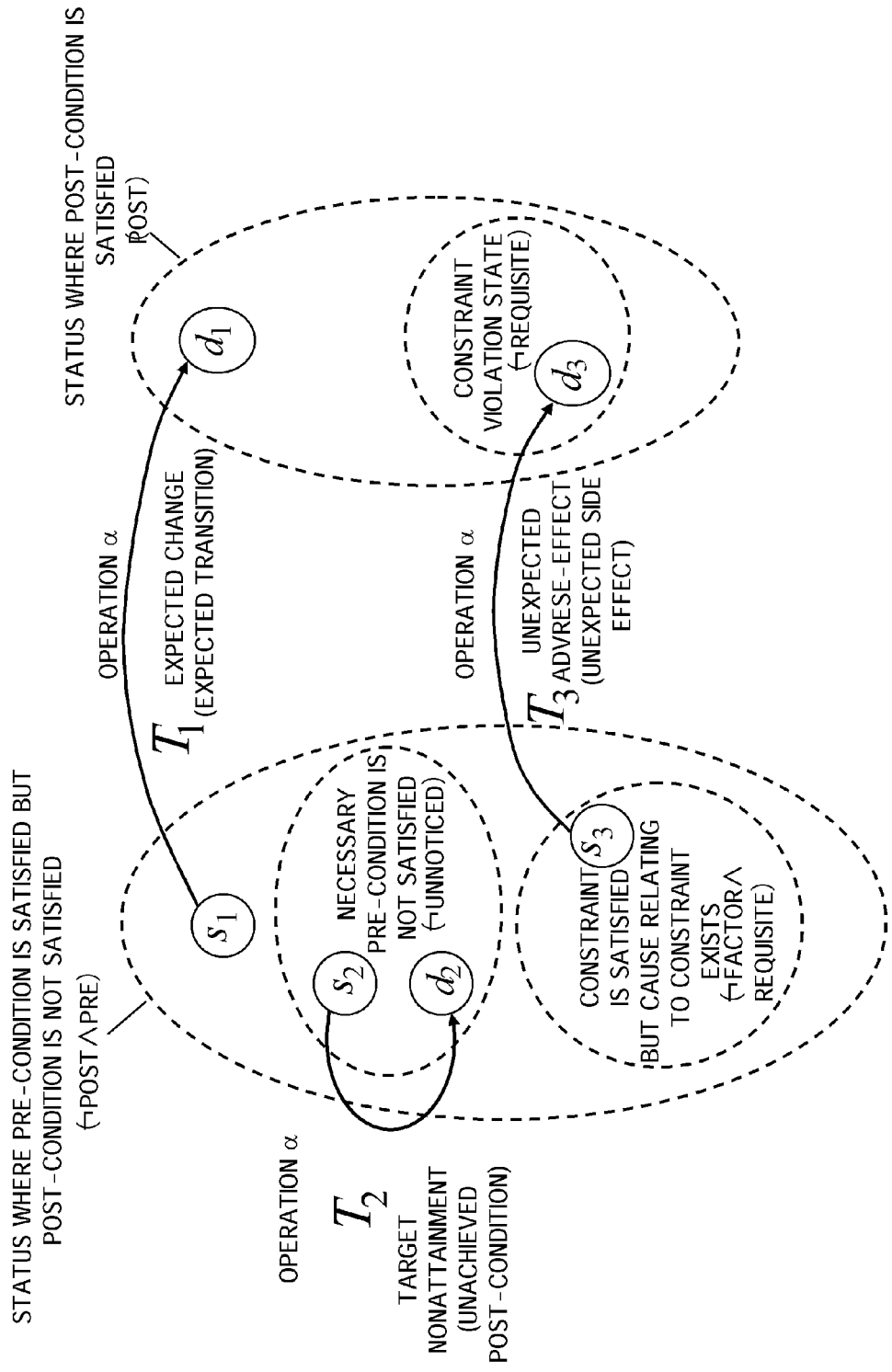
FIG. 2 is an explanatory diagram of a status transition model f at the time of modifying system configuration.

Briefly describing a difference between "(A) the unachieved post-condition" and "(B) the unexpected side effect", it is possible to express (A): "a portion to be changed was not changed" and (B): "a portion not to be changed was changed". These problems can be indicated by a status transition model as illustrated in FIG. 2.

Generally, in the case in which, for a certain operation $\alpha$ to be performed on the system by the manager, a pre-condition Pre which is a premise for executing this operation $\alpha$; and a post-condition Post which is to be satisfied at least in a certain constituent element being an execution object of the operation $\alpha$ as a result of execution of the operation $\alpha$ are expected, the status of the system is shifted from a status ($\neg$ Post$\neg$ Pre) in which the pre-condition is satisfied but the post-condition is not satisfied, to a status (Post) in which the post-condition is satisfied, when the operation $\alpha$ is executed. This is represented as a transition $T_1$ from a status $s_1$ to a status $d_1$ in FIG. 2.

However, practically, as in "(A) The unachieved post-condition" described above, there may the case in which the expected post-condition is not satisfied even if the operation is executed, due to defects of system status before execution of the operation. That is, this is the case ($\neg$Unnoticed) in which there is any cause to which the manager does not notice in the pre-condition necessary for executing the operation, and also, the system status does not satisfy the pre-condition. This case can be modeled as a situation in which, even if the operation $\alpha$ is executed, the status satisfying the post-condition Post may not be achieved as a transition $T_2$ from a status $s_2$ to a status $d_2$.

Furthermore, as in "(B) the unexpected side effect" described above, there may be the case in which, although the status of the constituent element being the execution objective of the operations satisfies the expected post-condition, unexpected changes occur in the remaining constituent elements. In the case example of clause 1-1, a situation corresponds to the above-mentioned case, in which, although an expected target of the DB performance improvement is achieved by revising the system management procedure in (Revision 1), as a result of this revision, unexpected changes, such as increase in user requests and deficiencies in network performance. In this situation, it can be considered that, as a result of executing the operations, although the system status is transitioned to the status satisfying the expected post-condition Post, additional problems which had not been caused before the transition occur. Then, this situation can be modeled as a transition $T_3$ from a status $s_3$ to a status $d_3$ when the operation $\alpha$ is executed. In this situation, there exists a factor which spoils the status which has been satisfied before the transition ($\neg$Factor$\wedge$ Requisite). It can be considered that, since the manager overlooked such a factor before executing the operations, the system status is shifted to a constraint violation status ($\neg$Requisite) as a result of executing the operations.

Figure 3:
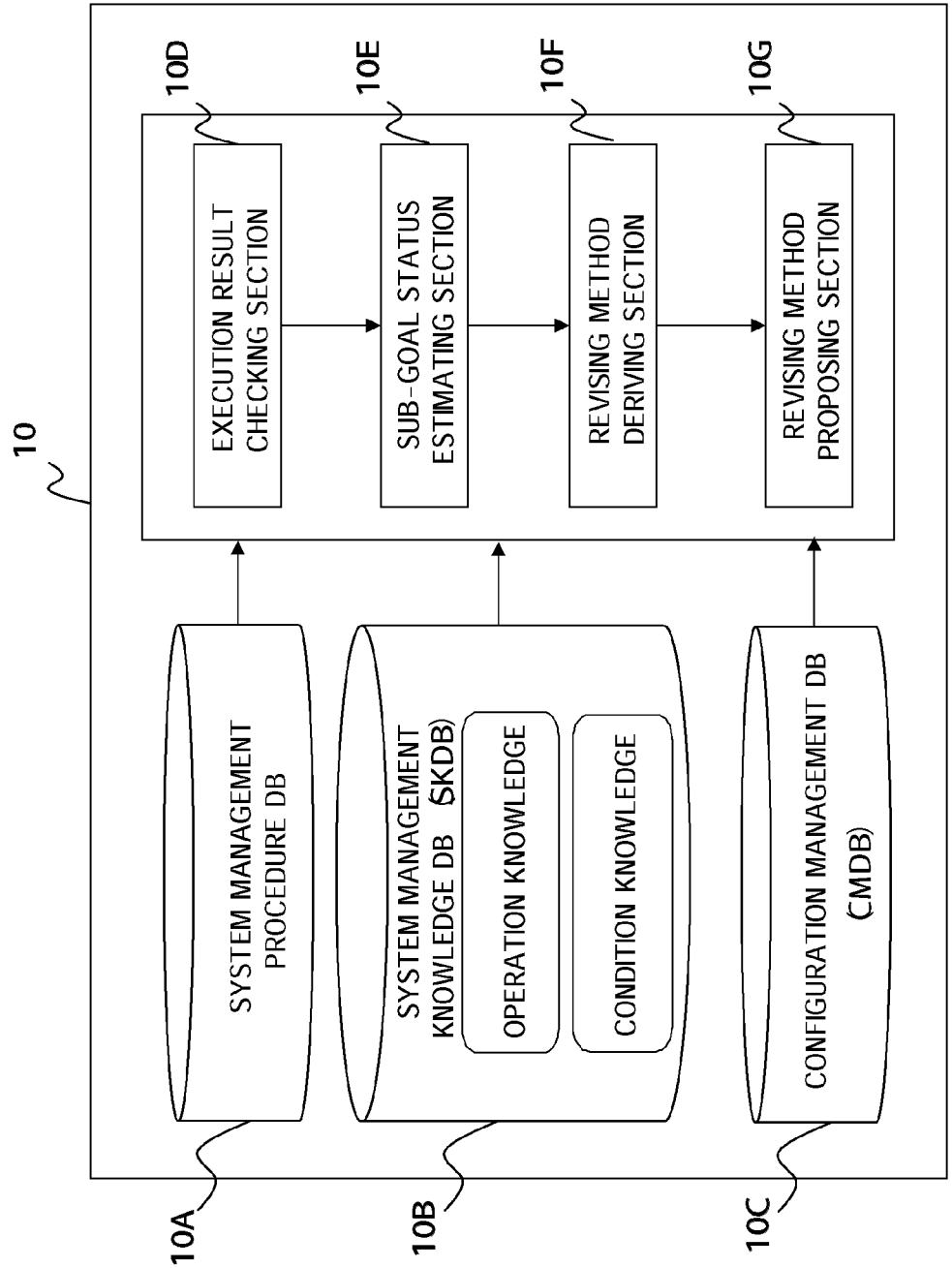
FIG. 3 is an explanatory diagram of a configuration of an operations management apparatus.

2. Overview of Operations Management Apparatus for Revising System Management Procedure and Operation Knowledge FIG. 3 illustrates a configuration of an operations management apparatus 10 capable of avoiding the problems described above. The operations management apparatus 10 is built on a computer which is provided with at least a central processing unit (CPU) and a memory. In addition, the operations management apparatus 10 includes a system management procedure DB 10A, a system management knowledge DB (SKDB, to be referred to as "SKDB", hereunder) 10B, and a system configuration management DB (CMDB, to be referred to as "CMDB", hereunder) 10C. Furthermore, in the operations management apparatus 10, an operations management program loaded in the memory is executed, so that an execution result checking section 10D, a sub-goal status estimating section 10E, a revising method deriving section 10F and a revising method proposing section 10G are achieved, respectively.

The system management procedure DB 10A stores the system management procedure including a plurality of operations for managing a computer system. An operator executes the operations in accordance with this system management procedure.

The SKDB 10B includes operation knowledge indicating, for each operation, a content of the operation, the pre-condition Pre in that the operation can be executed and the post-condition Post after the execution of operation. Furthermore, the SKDB 10B includes condition knowledge expressing a correlation between respective constituent elements which is necessarily established in the system, that is, a relationship necessarily established due to system characteristics and a parameter constraint to be always followed, in logical formulas or the like. In addition, specific examples of the operation knowledge and the condition knowledge will be described later.

The CMDB 10C stores information relating actual statuses of the respective constituent elements in the system, information being integrated as metadata, and is made by using well-known art (refer to, for example, CMDB Federation, http://www.cmdbf.org/).

The execution result checking section 10D checks the information relating to the system status stored in the CMDB 10C against the expected post-condition set based on the operation knowledge in the SKDB 10A, to detect a difference therebetween, when the system management procedure is revised by the manager, and the operations are executed based on the revised system management procedure. Furthermore, the execution result checking section 10D corresponds to a judging device and a judging method.

The sub-goal estimating section 10E estimates the sub-goal status capable of avoiding an unexpected result when the difference between the information relating to the actual status of the system which is stored in the CMDB 10C and the expected post-condition specified by the operation knowledge is detected, that is, when an unexpected result (failure) occurs.

The revising method deriving section 10F derives operations capable of reaching the estimated sub-goal status, and also derives an alternative system management procedure on (to) which these derived operations are reflected (added), as a revising method of the system management procedure. Furthermore, the revising method deriving section 10F derives alternative operation knowledge in which the pre-condition is revised by a condition satisfying the sub-goal status, as a revising method of the operation knowledge.

Incidentally, the sub-goal estimating section 10E and the revising method deriving section 10F correspond to a deriving device and a deriving method, respectively.

The revising method proposing section 10G proposes the alternative system management procedure and the alternative operation knowledge to the manager, as the revising methods. Incidentally, the revising method proposing section 10G corresponds to a proposing device and a proposing method.

Figure 4:
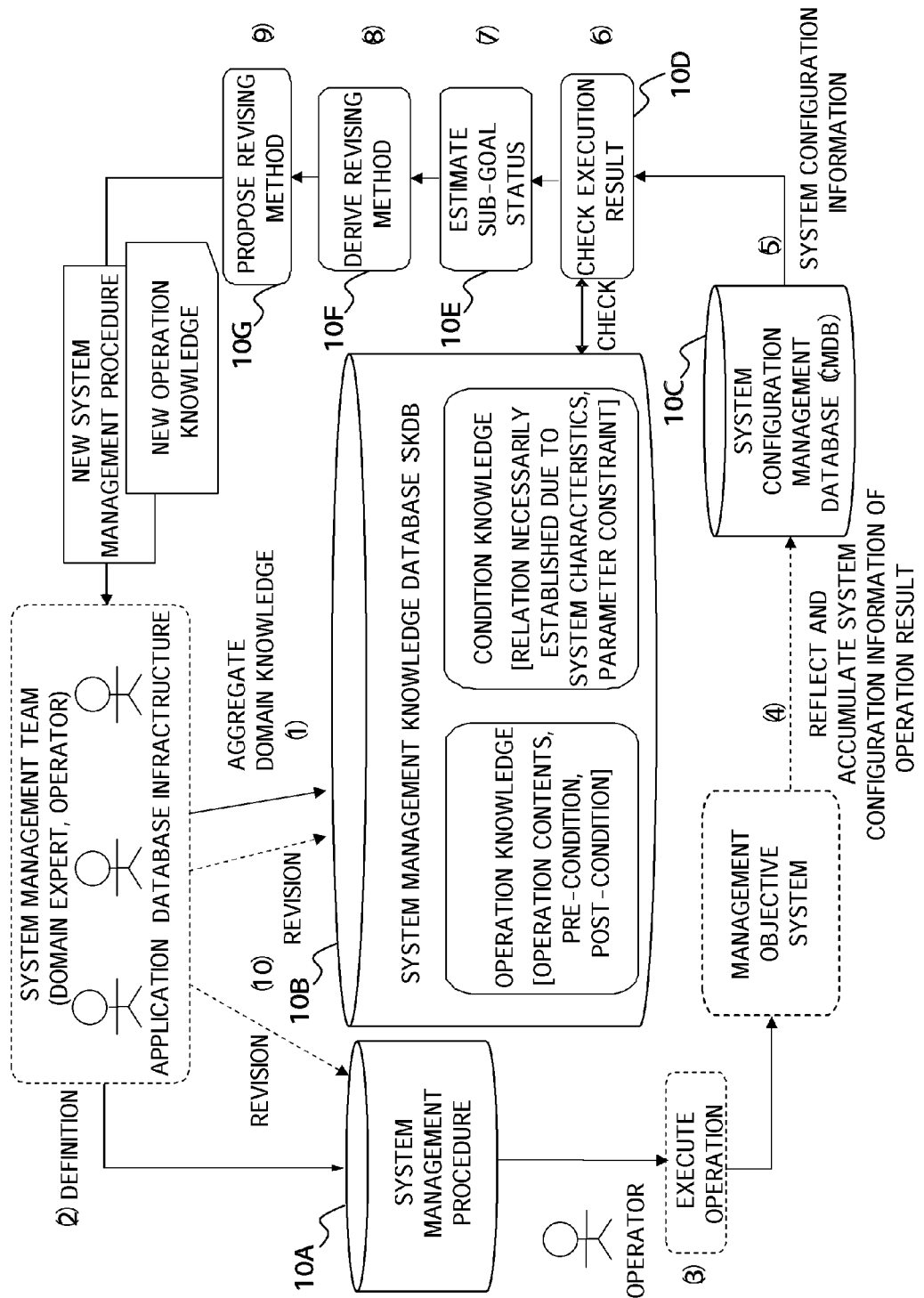
FIG. 4 is an explanatory diagram illustrating an alternative system management procedure and alternative operation knowledge.

FIG. 4 is a conceptual diagram illustrating a flow for updating the system management procedure and the operation knowledge, using the operations management apparatus 10 as described above. Firstly, as a premise for updating the system management procedure, domain knowledge of the domain expert who is the manager of each of the constituent elements (network, application, database and the like) being the objectives of the operations management, is aggregated in the SKDB 10B (1).

Furthermore, when any modification is made to the system, the domain expert combines the operations to be executed on the system with each other, to define the system management procedure, and stores the defined system management procedure in the system management procedure database 10A (2). The operator performs the operations for the system management on the system, based on the stored system management procedure (3). Command execution and batch processing execution by the operator are included in these operations. Then, information indicating the statuses of the respective constituent elements in the system as a result that the operations have been executed, is stored in the CMDB 10C (4). Furthermore, in the execution result checking section 10D, the statuses of the respective constituent elements (system configuration information) stored in the CMDB 10C, are referred to (5). Moreover, in the execution result checking section 10D, post-statuses of the respective constituent elements in the computer system, which are expected as the result of executing the operations, are specified, based on the operation knowledge and the condition knowledge stored in SKDB 10B (6). Then, the expected post-statuses of the respective constituent elements are compared with the statuses thereof stored in the CMDB 10C, and when they are inconsistent with each other, it is judged that an unexpected result, that is, a failure, occurred. In this case, the sub-goal status estimating section 10E estimates the sub-goal status capable of avoiding the failed state (7). Furthermore, the revising method deriving section 10F derives the alternative system management procedure on which the operations capable of reaching the sub-goal status are reflected and the alternative operation knowledge in which a condition satisfying the sub-goal status is set as a pre-condition, as the revising methods of the system management procedure and the operation knowledge (8). Then, the revising method proposing section 10H proposes these revising methods to the manager (9). The manager revises the system management procedure in the system management procedure DB 10A and the operation knowledge in the SKDB 10B based on the proposed revising methods (10).

Incidentally, FIG. 5 is a conceptual diagram illustrating methods of revising the system management procedure and the operation knowledge in the example of status transition model indicated in clause 1-2. As illustrated in FIG. 5, for the certain operation α, alternative operation knowledge α' in which the pre-condition is revised, is derived to be proposed, so that the certain operation α is executed, only when this operation α satisfies the necessary pre-condition, and also, the factor causing the unexpected side effect is eliminated. Furthermore, the alternative system management procedure in which the operations capable of satisfying this pre-condition are reflected on the system management procedure is derived to be proposed.

Thus, the alternative system management procedure is proposed, and the operations to be reflected on the system management procedure are specifically proposed, so that, even in the case in which the constituent elements outside the assigned domain are included in the system management objectives, the manager can properly revise the system management procedure. Furthermore, for the executed operations, the alternative operation knowledge is proposed, and the manager reflects the alternative operation knowledge on the operation knowledge. Accordingly, similar revisions can be performed on the remaining system management procedures including the same operations. Therefore, a further decrease of failures can be achieved.

3. Mode of Expression of System Management Knowledge

Herein, the operation knowledge and the condition knowledge as the system management knowledge are defined and modeled. Modes of expression of the respective knowledge used in the operations management apparatus 10 of the present invention described above will be explained using the case example of clause 1-1.

3-1 Definition of System Model

In the process of revising the system management knowledge, the system status and a change in the system status occurring by the operations on the system are modeled with a status transition model of four-term combination of $\langle S, R. L. \Sigma \rangle$. S is a set of all of system statuses, L is a mapping from each status $s \in S$ of S to a set P of proposition expressing properties established in such a status (L: $S \rightarrow 2^P$). A truth-value of the proposition expressing the system properties in each status is assumed to be decidable based on values of parameters stored in the CMDB 10C. For example, it is assumed that there is a predicate expressing a phenomenon satisfying SLA, and this predicate is defined to be false if a value of a parameter Res expressing a response time of the system stored in the CBDB 10C is equal to or larger than 1.0, while being true if the value is smaller than 1.0. At this time, in a certain status s, if Res=0.5, Satisfied (SLA)=True in this status (s|=Satisfied (SLA)).

Furthermore, $R \subset S \times \Sigma \times S$ expresses an action ($\Sigma$) executable on the system and a status change due to this action. For example, in the case in whish the system status is changed from s to s' due to an operation of rebooting the system, (s, Reset, s') $\in R$.

3-2 Operation Knowledge

The operation knowledge expresses the operations on the system supposed by the domain expert and the status change as a result of the execution of operations. To be specific, an atomic operation $Op_i$ to the system is defined with a three-terms combination of $Op_i = (Pre_i, Act_i, Post_i)$. $Act_i$ is an action to be executed on the system by the operation $Op_i$ and the $Pre_i$ is predicate logical formula of the pre-condition as a premise for executing the action $Act_i$ and $Post_i$ is predicate logical formula of the post-condition which is expected to be true in the status after execution of the operation, and Pre, and Post, are expressed in conjunctive normal forms (CNF: to be referred to as "CNF") made up by an and-conjunction of a positive or negative literal (single predicate) and conjunction. That is, in this operation knowledge, it is expressed that the domain experts expects that, if the action called $Act_i$ is executed in a certain status of s|=$Pre_i$, the system status is changed to the status s' in which s'|=$Post_i$. For example, the operation of "when the configuration file of DB is edited, the configuration file is changed" in the case example of clause 1-1, can be defined as the following $Op_{cfgDB}$.

$Op_{cfgDB} = \langle \neg changed(DBcfg), edit\_DBcfg, changed(DBcfg) \rangle$

Incidentally, attention is needed so that the operation knowledge is the status change supposed by the domain expert being the manager, and this is not necessarily correct. That is, even if $\langle f_1, Act_x, f_2 \rangle \in O_n$, and even if $s_1 = f_1$ and $s_2 = f_2$, there may be $\langle s_1, Act_x, s_2 \rangle \notin R$ Furthermore, in the following description, in order to lead the intuitive understanding, the operation knowledge $Op_i = \langle Pre_i, Act_i, Post_i \rangle$ is assumed to be describable as $(Act_i; Pre_i \rightarrow Post_i)$.

In the case example of clause 1-1, it is assumed that the following operations are defined other than the above $Op_{cfgDB}$.

$Op_{rbtDB}$: (reboot_DB; $\neg updated(DB) \wedge changed(DBcfg) \rightarrow updated(DB)$)

$Op_{chkDB}$: (chkcfg_DBcfg; $changed(DBcfg) \rightarrow checked(DBcfg)$)

$Op_{updNW}$: (updated_NW; $\neg updated(NW) \rightarrow updated(NW)$)

The above-mentioned $Op_{rbtDB}$ expresses an operation by which the update is completed by rebooting the server in a state in which the update of the DB server has not yet been finished and also the configuration file of the DB server has been modified. The $Op_{chkDB}$ expresses an operation by which the configuration file of the DB server is verified to be revised by checking the setting of the DB server in a state in which the configuration file of the DB server has been modified. The $Op_{updNW}$ expresses an operation by which the update of the network becomes a completed state after an update work is performed on the network.

Since the operation knowledge as described above is aggregated to be stored in the SKDB 10B, it is possible for the manager to understand the action, the pre-condition and the post-condition of the operation on the constituent element outside the manager's assigned domain. Therefore, when the manager combines the respective operations with each other to define the system management procedure, the manager can combine the appropriate operations with each other by referring to this operation knowledge.

3-3 Condition Knowledge

The condition knowledge expresses the correlation (properties) necessarily satisfied among the respective constituent elements of the system in a logical formula. To be specific, a phenomenon occurring in each constituent element, and a correlation between parameters and the like, correspond to this condition knowledge. Furthermore, this condition knowledge is extracted from each domain expert's knowledge relating to the system, the definition of requested service quality demand which is determined by a person in charge of the entire system and the like. A truth-value of the logical value expressing the condition knowledge is assumed to be true in all of statuses to which the system can reach. In the case in which the system reaches a status in which the truth-value becomes false, it means that there are caused problems in that, for example, the condition knowledge is erroneous, or conditions required in the system such as the service quality, and the like are no longer satisfied.

In the case example of clause 1-1, it is provided that the manager of the DB server, the manager of the network and the manager of the entire service have the following different condition knowledge respectively, and each condition knowledge is stored as the condition knowledge of the SKDB 10B.

(1) DB Server Manager Knowledge $C_{DB1}$: $satisfied(SLA) \rightarrow enoughcapacity(DB)$
$C_{DB2}$: $updated(DB) \rightarrow checked(DBcfg)$
$C_{DB3}$: $updated(DB) \rightarrow enoughcapacity(DB)$ $C_{DB1}$ indicates the knowledge in that, if the SLA of the service is satisfied, the DB server has the enough capacity. Furthermore, $C_{DB2}$ indicates the knowledge in that, if the DB server is in the updated state, the configuration file thereof is to have already been checked. Furthermore, $C_{DB3}$ indicates the knowledge in that, if the update of the DB server is completed, this DB server has sufficient capacity.

(2) Network Manager Knowledge $C_{NW1}$: $satisfied(SLA) \rightarrow enoughcapacity(NW)$
$C_{NW2}$: $updated(NW) \rightarrow enoughcapacity(NW)$ $C_{NW1}$ indicates the knowledge in that, if the SLA of the service is satisfied, the network has sufficient capacity (enough capacity). Furthermore, $C_{NW2}$ indicates the knowledge in that, if the network is in the updated state, the network has sufficient capacity.

(3) Service Manager Knowledge $C_{SM1}$: $enoughcapacity(NW) \wedge enoughcapacity(DB) \rightarrow satisfied(SLA)$ $C_{SM1}$ indicates the knowledge in that, if both of the network and the DB server have sufficient capacities, the SLA is satisfied.

Each condition knowledge as described above is aggregated to be stored in the SKDB 10B, so that the manager can obtain also the knowledge relating to the conditions necessarily satisfied due to the system properties, for the constituent elements outside the manager's assigned domain. Therefore, when the manager combines the operations with each other to define the system management procedure, the manager can combine the appropriate operations with each other by referring to this condition knowledge.

3-4 System Management Procedure

In the clause 3-2, the operations executable on the system are defined as the operation knowledge. Here, in the case of making certain modifications in the system, it is often necessary to perform pre-processing or post-processing on a targeted work typically. Therefore, to make any modification in the system, the manager combines the operations accumulated in the operation knowledge with each other to define the system management procedure. Herein, for simplifying the explanation, it is provided that the system management procedure does not include a conditional branch or a loop, and is made up by a sequence of operations in the operation knowledge. In this regard, it is provided that, in the system management procedure, there is no inconsistency between a post-condition of a certain operation and a pre-condition of the next operation. To be specific, when the procedure $Pr = (Op_1, Op_2, \ldots Op_n)$ is made up by n operations, if $S_i^{Post} = \{s | s = Post_i\}$ and $S_{i+1}^{Pre} = \{s | s = Pre_{i+1}\}$, $S_i^{Post} \cap S_{i+1}^{Pre} \neq \{\}$ is to be achieved.

In the case example of clause 1-1, the system management procedure for updating the DB server, which was defined by the manager in order to solve the capacity shortage of the DB server, is made up by the two works of (1) modifying the setting of the DB server and (2) rebooting the server, and therefore, it is possible to define that $Pr = (Op_{cfgDB}, Op_{rbtDB})$.

Figure 6:
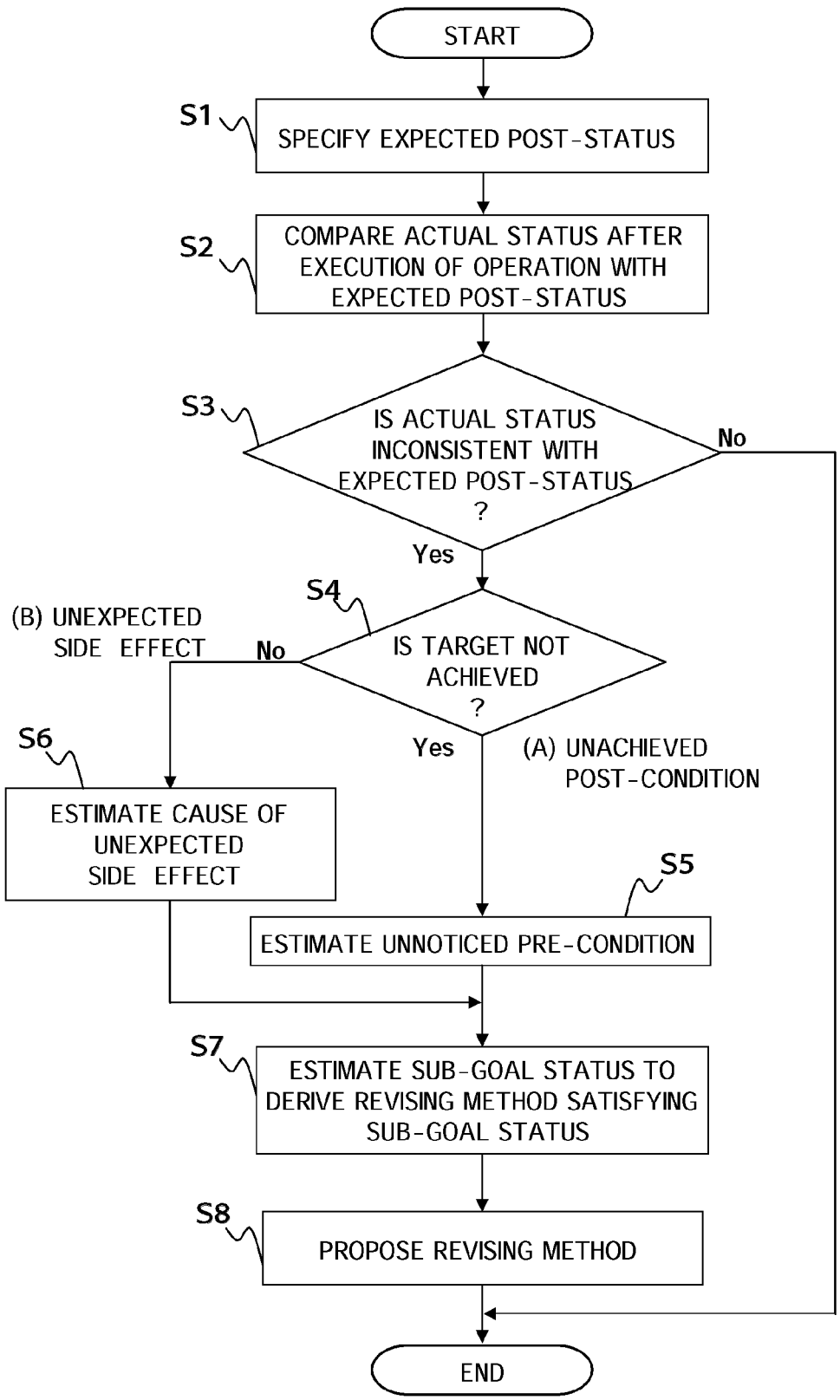
FIG. 6 is a flowchart illustrating a process of proposing revising methods of the system management procedure and the operation knowledge.

4. Processing Flow of Proposing Revising Methods of System Management Procedure and Operation Knowledge Here, there will be described the processing of proposing the revising methods of the system management procedure and the operation knowledge, which are executed in the operations management apparatus 10, using a flowchart of FIG. 6. Incidentally, it is supposed that the system management procedure is stored in the system management procedure DB 10A, and the operation knowledge and the condition knowledge are stored, respectively, in the SKDB 10B. Furthermore, this processing is executed after the operations are executed in accordance with the system management procedure.

In step 1 (to be abbreviated as "S1" in the figures, and the same rule will be applied to the subsequent steps), based on the executed system management procedure and the operation knowledge stored in the SKDB 10B, the post-status after the execution of operations, which is expected on the system management procedure, is specified.

In step 2, the CMDB 10C is referred to, and the actual status of each constituent element of the system after the execution of operations is compared with the expected post-status specified in step 1.

In step 3, it is judged whether or not the actual status of each constituent element of the system after the execution of operations is inconsistent with the expected post-status specified in step 1. If the actual status is inconsistent with the expected post-status (Yes), the routine proceeds to step 4, whereas if the actual status is consistent with the expected post-status (No), the routine is terminated.

Incidentally, steps 1 to 3 are executed by the execution result checking section 10E, and correspond to judging means and a judging step.

In step 4, it is judged whether or not the constituent element being the execution objective of the operations is in a state in which the expected post-condition of the operation knowledge is not satisfied, that is, whether or not the constituent element is in the state of "(A) unachieved post-condition". If the constituent element is in the state of "(A) unachieved post-condition" (Yes), the routine proceeds to step 5, whereas if the constituent element is in the state of "(B) unexpected side effect" satisfying the post-condition of the operation knowledge (No), the routine proceeds to step 6.

In step 5, based on a difference between the actual status after the execution of operations and the expected post-status specified in step 1, a pre-status (which has been overlooked) necessary for the system to reach a desired status is estimated.

In step 6, based on a difference between the actual status after the execution of operations and the expected post-status specified in step 1, the side effect which has not been supposed is estimated.

In step 7, the pre-status estimated in step 5 or a state in which the adverse-effect estimated in step 6 has been eliminated is estimated as the sub-goal status. Then, the alternative operation knowledge in which the pre-condition of the operation knowledge is revised under a condition satisfying the sub-goal status in the system management procedure is derived. Furthermore, operations capable of satisfying this pre-condition are derived, and moreover, the alternative system management procedure in which the derived operations are reflected in the system management procedure is derived.

Incidentally, steps 4 to 7 are executed by the sub-goal status estimating section 10F and the revising method deriving section 10G, and correspond to deriving means.

In step 8, the alternative system management procedure and the alternative operation knowledge, which have been derived in step 7, are proposed to the manager. Incidentally, step 8 is executed by the revising method proposing section 10G, and corresponds to proposing means and a proposing step.

Hereunder, the above-mentioned processing will be described in detail, in the cases of (A) and (B), while using the case example of clause 1-1.

4-1 Case of "(A) Unachieved Post-Condition"

In the system management procedure $(Op_1, Op_2, Op_n)$, it is assumed that the actual post-status after the execution of the m-th operation $Op_m$ ($1 \leq m \leq n$) is different from the post-condition $Post_m$ expected in the operation knowledge. In such a case, firstly, it is necessary to clarify a difference between the post-condition expected in the operation knowledge and the actual system status stored in the CMDB 10C. Therefore, the post-status of the system expected for when the sequence of operations defined by the system management procedure is executed, is derived. To be specific, the expected pre-status $e_i^{Pre}$ and post-status $e_i^{Post}$ in each operation $Op_i = \langle Pre_i, Act, Post_i \rangle$ are derived by the following algorithm, as a set of predicates established in these status.

Stage 1: Initial Setting
  $i=1$, $e_0^{Post}$=Premise

Stage 2: Creation of Pre-Status
  $e_i^{Pre} = e_{i-1}^{Post} \cup A(Pre_i)$

Stage 3: Creation of Post-Status
  $e_i^{changed} = \{l | l \in e_i^{Pre}, \neg \in A(Post_i)\} \cup \{\neg l | l \in e_i^{Pre}, l \in A(Post_i)\}$
  $e_i^{Post} = \text{Closure}((e_i^{Pre} - e_i^{changed}) \cup A(Post_i))$ Stage 4: Repetition
  $i$++; goto stage 2 until $i=m$ In the above algorithm, Premise is a set of literals supposed to have been established in the state before executing the system management procedure. Furthermore, a function A is mapping $A(P_1 \wedge P_2 \wedge \ldots P_x) = \{P_1, P_2, \ldots, P_x\}$ from a logical formula in CNF format to the set of literals included in this logical formula, and a function Closure is mapping from the set of predicates to a set of predicates which is derivable from the predicates and the condition knowledge.

In the above algorithm, firstly, in the initial setting in stage 1, the set of logical formulas Premise established before executing the first operation $Op_1$ is set at $e_0^{Post}$. Next, in stage 2, a set $e_i^{Pre}$ of logical formulas supposed to have been established before executing $Op_i$ is calculated, based on sum of sets of the logical formulas established after the execution of $Op_{i-1}$ and the pre-condition $Pre_i$ of $Op_i$. In stage 3, a set $e_i^{changed}$ of predicates each of which truth-value is expected to change before and after the execution of the operation $Op_{i-1}$ is calculated. Then, the post-status $e_i^{Post}$ after the execution of $Op_i$ is calculated, based on a set obtained by eliminating the set $e_i^{changed}$ of predicates from the set $e_i^{Pre}$, the post-condition $Post_i$ of Opi and the set of the predicates derivable from the set obtained by eliminating the set $e_i^{changed}$ of predicates from the set $e_i^{Pre}$ and the post-condition $Post_i$ of Opi and the condition knowledge. By repetitively performing the above calculations until $i=m$, it is possible to specify the pre-status expected to have been established before the execution of each operation and the post-status expected to have been established after the execution of each operation.

The expected post-statuses which are specified in the case example of clause 1-1 are illustrated in FIG. 7(A). These are the statuses expected as the pre-status and the post-status of each operation for when the defined system management procedure $Pr=(Op_{cfgDB}, OP_{rbtDB})$ is executed in the initial status Premise={¬enoughcapacity(DB), enoughcapacity(NW)} where the DB server is in the bottleneck. In the table, the one indicated as "T" is a logical formula which is included in each expected status, and the one indicated as "F" is a logical formula of which negation is included in each expected status. For example, in $e_{rbtDB}^{Post}$ representing a status of a result of consecutively executing the operations $Op_{cfgDB}$ and $Op_{rbtDB}$, it is indicated that a state where updated (DB) and satisfied(SLA) are established, the update of the DB server is completed, and the SLA is satisfied has been expected by the system management knowledge.

On the other hand, it is provided that an actual truth-value state (interpretation) obtained by the logical formula can be derived from the CMDB 10C in which the actual system statuses are stored. For example, the system statuses derived from the CMDB 10C, which have been established in the pre-status and the post-status of each operation when each operation $Op_i$ is practically executed, are expressed as $s_i^{Pre}$ and $s_i^{Post}$, respectively. Then, a fact that the expected result could not be obtained by the execution of the operation $Op_i$ means that there has existed the following literal.

$I \in A(Post_i)$ and $I \not\in s_i^{Post}$

For example, in the case example of clause 1-1, it is provided that the truth-value table as in FIG. 7(B) is obtained. In comparison of the post-status $s_{rbtDB}^{Post}$ of operation in this result with $e_{rbtDB}^{Post}$ in FIG. 7(A), updated(DB) is true after the execution of the operation $Op_{rbtDB}$ in the latter case, whereas updated(DB) is still false in the former case (portion surrounded by a solid circle line in FIG. 7(B)). It means that, although the work for modifying the DB server was performed in accordance with the system management procedure, the DB server has not been correctly rebooted, and accordingly, the update has not been completed as expected.

In such a case, a difference between information of the actual status of each constituent element and information of the expected post-status thereof is extracted, and the pre-condition of operation which has been missing in the operation knowledge is derived from the information. To be specific, if there are propositions which lead to results different from the expected results, other than the post-condition $Post_i$ of $Op_i$ expected in the operation knowledge, those propositions are extracted and it is assumed that an unnoticed condition preventing a goal is included in those propositions. Then, a status in which the difference is eliminated is set as the sub-goal status, and the system management procedure and the operation knowledge are revised so as to reach the sub-goal status, before executing the operation in which the problem has been caused.

The above described processing will be further specifically explained in the following. In the case in which the expected result was not obtained by the operation, among the set of literals of each of which truth-value is different in the actual status $s_m^{Post}$ of each constituent element and in the expected post-status $e_m^{Post}$ thereof, the one which is not included in the post-status $A(Post_m)$ of the operation knowledge is extracted. This can be expressed as follows.

$D = \{d | d \in e_m^{Post}, \neg d \in s_m^{Post}, d \not\in A(Post_m)\}$

Then, the one obtained by adding "$U \subset D$" being a part of the above D to the set $e_{m-1}^{Post}$ of literals established in the post-status of $Op_{m-1}$ is defined as a sub-goal status $e^{sgoal}$ as follows. However, if "$\neg d \in U$" is included in $e_{i-1}^{Post}$, it is eliminated. Furthermore, the one of which inconsistency is led by the state knowledge is not deemed as the sub-goal status.

$e^{sgoal} = U \cup \{d | d \in e_{m-1}^{Post}, \neg d \not\in U\}$

In the case example of clause 1-1, comparing $e_{rbtDB}^{Post}$ in FIG. 7(A) with $s_{rbtDB}^{Post}$ in FIG. 7(B), it is understood that $D = \{checked(DB_{cfg}), enoughcapacity(DB), satisfied(SLA)\}$ (portions surrounded by broken line circles in FIG. 7(B), and a fact that any one of them is false in the state after the execution of $Op_{rbtDB}$ is OD estimated as a condition in that updated(DB) has not yet been established in state. Thus, as the sub-goal status satisfying the above conditions, the following three sub-goal statuses are expected as candidates.

$e_1^{sgoal} = \{changed(DBcfg), checked(DBcfg), \neg enoughcapacity(DB), enoughcapacity(NW), \neg satisfied(SLA)\}$ $e_2^{sgoal} = \{changed(DBcfg), enoughcapacity(DB), enoughcapacity(NW), satisfied(SLA)\}$ $e_3^{sgoal} = \{changed(DBcfg), checked(DBcfg), enoughcapacity(DB), enoughcapacity(NW), satisfied(SLA)\}$ In deriving the above sub-goal statuses, a situation which includes $\neg$ enoughcapacity(DB) or $\neg$ enoughcapacity(NW) while including satisfied(SLA) is inconsistent with the condition knowledge $C_{SM1}$, and therefore, is not deemed as the sub-goal status.

When the sub-goal status is set as described above, the procedure for reaching the sub-goal status is derived by planning. Incidentally, the planning is a work for deriving the sequence of operations capable of reaching any one of the above sub-goal statuses from the post-status $e_{m-1}^{Post}$ of $Op_{m-1}$, and it is possible to utilize an approach or the like disclosed in "K. E. Maghraoui, Model Driven Provisioning: Bridging the Gap Between Declarative Object Models and Procedural Provisioning Tools, Proc. of Middleware 2006, 2006". Here, this work is for solving the problem caused by the operation $Op_m$, and therefore, the operation $Op_m$ is not included in the array of operations.

When the sequence of operations is derived by utilizing the planning, the alternative system management procedure in which the sequence of operations is inserted after the operation $Op_m$ is proposed. Furthermore, for $U \subset D$ included in the sub-goal status of the sequence of operations, the alternative operation knowledge in which $U \subset D$ is added to the pre-condition $Pre_i$ of the operation knowledge $Op_m$ is proposed.

In the case example of clause 1-1, the sub-goal status $e_2^{sgoal}$ and the procedure for reaching $e_e^{sgoal}$ (procedure leading enoughcapacity(DB) and satisfied(SLA)) are unable to be derived from the stored knowledge by the planning. However, as the sequence of operations for reaching $e_1^{sgoal}$, $\{Op_{chkDB}\}$ is selectable as a candidate. As a result, the following contents can be output, as the revising methods of the system management procedure Pr and the operation knowledge $Op_{rbtDB}$, that is, the alternative system management procedure Pr' and the alternative operation knowledge $Op'_{rbtDB}$.

$Op'_{rbtDB}(reboot\_DB): (\neg updated(DB) \wedge changed(DBcfg) \wedge checked(DBcfg) \rightarrow updated(DB))$ $Pr' = (Op_{cfgDB}, Op_{chkDB}, Op'_{rbtDB})$ The alternative system management procedure and the alternative operation knowledge mean that the configuration file needs to be checked before updating the DB server by the reboot.

Thus, the alternative system management procedure on which the operations capable of satisfying the sub-goal status are reflected is proposed, so that the domain expert or the person-in-charge of the service as the manager can properly revise the system management procedure. Therefore, it is possible to prevent the recurrence of the same failure when this system management procedure is executed in the subsequent processing. Furthermore, the alternative operation knowledge in which the pre-condition is revised is proposed to be reflected on the operation knowledge by the manager. Therefore, it becomes possible to perform similar revisions on the remaining system management procedures including the same operation, and thus, also in the remaining system management procedures, it is possible to prevent the recurrence of the same failure.

4-2 Case of "(B) Unexpected Side Effect"

Next, it is assumed that, in the system management procedure $(Op_1, Op_2, \ldots Op_n)$, although the actual post-status after the execution of the m-th operation $Op_m (1 \leq m \leq n)$ is consistent with $Post_m$, a change is caused in the statuses (properties) other than $Post_m$ due to an unexpected change in system status, so that an unexpected result is obtained Also in this case, similarly to the case of "(A) unachieved post-condition", the pre-status and the post-status which are expected before and after executing each operation included in the system management procedure are derived, and also, information relating to the actual system is collected from the CMDB 10C. For example, in the case example of clause 1-1, it is provided that, when the revised alternative system management procedure Pr' described in the former clause has been executed, the expected post-status of each constituent element and the actual status thereof become as in FIG. 8(A) and FIG. 8(B). Then, the system statuses, each of which expected post-status is different from the actual status, and of which truth-value is changed before and after the execution of operations, are specified as a set of propositions in which unexpected changes occur, as follows.

$$D = \{d | d \in e_m^{Pre}, \neg d \in e_m^{Post}, \neg d \notin Post(Op_m)\}$$

In the case example of clause 1-1, D={enoughcapacity (NW)} (portion surrounded by a solid line circle of FIG. 8(B)). This leads to different results of the truth-value of satisfied(SLA) in FIG. 8(A) and FIG. 8(B) (portion surrounded by a broken line circle of FIG. 8(B)).

In order to avoid the caused problem, it is necessary that factors of D are guaranteed to be true even after the execution of the operation $Op_m$. Thus, the sub-goal status in which the factors are explicitly guaranteed is set, and the planning is performed so as to pass through the set sub-goal status. To be specific, consideration is made on the following two sub-goal statuses.

$$e_A^{sgoal} = e_{m-1}^{Post} \cdot D$$
$$e_B^{sgoal} = e_{m-1}^{Post}$$

That is, in the state after the execution of the operation $Op_{m-1}$, the sub-goals each in which the truth-values of the factors of D are indefinite are set, and a sequence of operations connecting between the set sub-goals is derived. Thus, a condition for establishing D is satisfied even after the execution of the operation $Op_m$, and therefore, D will not be false, so that unexpected problems can be avoided.

When the sequence of operations $(Op_1^{sg}, Op_2^{sg}, Op_n^{sg})$ connecting between the above two sub-goals is derived by the planning, this sequence of operations is inserted between $Op_{m-1}$ and $Op_m$ of the defined operations $(Op_1, Op_2, \ldots, Op_n)$, that is, $(Op_1, \ldots Op_{m-1}, Op_1^{sg}, \ldots Op_x^{sg}, Op_m, \ldots Op_n)$, to thereby derive the alternative system management procedure.

In the case example of clause 1-1, as the sequence of operations for status transition from the (uncertain) status $e_A^{sgoal}$ where enoughcapacity(NW) is not established to the status $e_B^{sgoal}$ where enoughcapacity(NW) is established, $\{Op_{updNw}\}$ is selectable by the planning (in the post-status of $OP_{updNW}$, since updated(NW) is established, enoughcapacity (NW) is also established by the condition knowledge $C_{NW2}$).

In the above-described system management procedure, the status $e_{m-1}^{Post}$ which is expected after the execution of the operation $Op_{m-1}$ and $e_{sg\_x}^{Post}$ which is expected after the execution of the operation $Op_x^{sg}$ are compared with each other, and a difference of propositions established therein $e_{sg\_x}^{Post} - e_{m-1}^{Post}$ is specified. This difference is extracted as a condition necessary for avoiding the problem, to be added to the operation $Op_m$ in which the problem is caused. In the case example of clause 1-1, updated(NW) corresponds to the difference.

As a result of the above modification, the operation knowledge and the system management procedure are revised as follows.

$Op'_{rbtDB}$(reboot_DB): ($\neg$updated(DB)$\wedge$ changed (DBcfg)$\wedge$ checked(DBcfg) $\wedge$ updated(NW)$\rightarrow$updated (DB))

$Pr' = (Op_{chfDB}, Op_{chkDB}, OP_{updNW}, Op'_{rbtDB})$

Thus, not only in the case in which the direct execution object of the operation of the system management procedure is achieved, but also in the case in which the unexpected status changes occur in the remaining constituent elements, the alternative system management procedure and the alternative operation knowledge capable of preventing the recurrence of the same failures are proposed. Therefore, similarly to the case of "(A) unachieved post-condition", the manager can revise properly the system management procedure and the operation knowledge, so that the decrease of failures can be achieved.

5. Specific Data Array in the Revising Methods of the System Management Procedure and the System Management Knowledge The method of revising the knowledge described above will be explained in detail using a specific data array.

5-1 Input

The input to the system operations management apparatus 10 is made up by four inputs of "(1) definition of system management procedure (procedure definition)", "(2) operation knowledge", "(3) condition knowledge" and "(4) the pre-status and the post-status specified for each operation", and each input has the following data structure.

(1) Definition of System Management Procedure

```
typedef struct {
    OP_KNOWLEDGE[ ] *operation; //
                            Sequence of pointers
                            to operation knowledge
    int[ ] premise_T;
    int[ ] premise_F;
} PROCEDURE;
```

The system management procedure is made up by an array of pointer references to the operation knowledge which makes up the procedure. For example, if a certain procedure is made up by two operations A and B, operation[0]=*A, operation[1]=*B.

Furthermore, a premise, for when this system management procedure is executed, is designated based on premise_T and premise_F, by using a method similar to a premise in the operation knowledge described below.

(2) Operation Knowledge

```
typedef struct {
    char[ ] name; // Name of operation
    char[ ] command; // command executed
                            by the operation
    int[ ] pre_cond_T;
    int[ ] pre_cond_F;
    int[ ] post_cond_T
    int[ ] post_cond_F;
} OP_KNOWLEDGE;
```

The operation knowledge which makes up the system management procedure is made up by names of respective operations, practical processing contents (commands, a work of displaying prompts for instructing humans and the like), and the pre-condition and the post-condition of this procedure.

In the above data structure, the names of operations and the processing contents are described in text style. Furthermore, it is provided that the predicates used in the operation knowledge and the condition knowledge are separately defined in the array Predicate, and are allocated with numbers, respectively. Furthermore, it is provided that, as a pre-condition to be established (True) before the execution of each operation, the number designating a predicate thereof is placed in the array pre_cond_T. Similarly, it is provided that a condition not to be established (to be False) before the execution of each operation is stored in pre_cond_F, post-conditions to be established after the execution of each operation is stored in post_cond_T, and post-conditions not to be established after the execution of each operation is stored in post_cond_F.

(3) Condition Knowledge

```
typedef struct {
    int[ ] if_T;
    int[ ] if_F;
    int[ ] then_T
    int[ ] then_F;
} COND_KNOWLEDGE;
```

In the condition knowledge, positive literal included in the left hand (condition) of imply in the logical formula are designated by if_T, and negative literal included in the left-hand side of imply in the logical formula are designated by if_F, as the numbers indicating the predicates. Similarly, positive and negative literals included in the right-hand side (result) are designated by then_T and then_F, respectively.

(4) Pre-Status and Post-Status Specified for Each Operation

```
typedef struct {
    boolean[ ][ ] before_op;
    boolean[ ][ ] after_op;
} SYSTEM_STATUS;
```

In the case in which it has been proved by the CMDB 10C that a fact represented by the predicate designated by the number j was established before the execution of the i-th operation in the system management procedure, the pre-status is before_op[i][j]=True, and otherwise, the prestatus is False. Similarly, the post-status after the execution of operations is expressed by after_op.

5-2 Output

Outputs proposed by the system to a user are "(1) the alternative system management procedure" and "(2) the alternative operation knowledge", which have the following data structures, respectively.

(1) Alternative System Management Procedure

```
typedef struct {
    PROCEDURE *orig_proc; // Pointer to
                             original procedure
    OP_KNOWLEDGE[ ] *operation; //
                             Sequence of pointers
                             to operation knowledge
} ALT_PROC;
```

Similarly to the above-described system management procedure, the alternative system management procedure has a pointer to the sequence of operations making up this procedure. In addition, the alternative system management procedure has a pointer to the original system management procedure being the objective to be replaced by this alternative system management procedure.

(2) Alternative Operation Knowledge

```
typedef struct {
    OP_KNOWLEDGE orig_op; // original
                              operation knowledge
    char[ ] name; // Name of operation
    char[ ] command; // command executed
                              by the activity
    int[ ] pre_cond_T;
    int[ ] pre_cond_F;
    int[ ] post_cond_T
    int[ ] post_cond_F;
} ALT_OP_KNOWLEDGE;
```

The alternative operation knowledge also has a pointer to the information in the operation knowledge, and also, to the original operation knowledge being the objective of replacement.

5-3 Calculation for Deriving Alternative System Management Procedure and Alternative Operation Knowledge Here, for the case of "(A) unachieved post-condition" in the case example of clause 1-1, there will be specifically described a flow of work for deriving the alternative system management procedure and the alternative operation knowledge on the computer, based on the above data. Incidentally, also for the unexpected side effect, the alternative system management procedure and the alternative operation knowledge can be derived in a similar way, and therefore, the description thereof is omitted here.

5-3-1 Input Data Definition

Here, it is assumed that the followings are prepared as the input.

(1) System Management Procedure

```
PREDICATE[ ]={"changed(DBcfg)",
              "updated(DB)",
              "checked(DBcfg)",
              "enoughcap(DB)",
              "enoughcap(NW)",
              "updated(NW)",
              "satisfied(SLA)"}
```

It becomes possible to designate the predicates of from changed(DBcfg) to satisfied(SLA) by integers of 0 to 6, by the definition of the above array Predicate (an example: PREDICATE[1]="update(DB)").

```
PROCEDURE pr = {
    {*cfgDB, *rbtDB},
    {4},{3}
}
```

It is defined that the above-described system management procedure pr is defined by the sequence of two operations indicated by *cfgDB and *rbtDB, and furthermore, that it is assumed that, when the execution of the operations, PREDICATE[4](enoughcap(NW)) has been established and PREDICATE[3](enoughcap(DB) has not been established.

(2) Operation Knowledge

```
OP_KNOWLEDGE cfgDB ={
    "edit DBcfg",
    "vi DB.cfg",
    { },{0},{0},{ }}
```

In the definition of the above operation cfgDB, it is defined that the name of this operation is "edit DBcfg", a practical work content is to edit the file DB.cfg by a vi editor, and the truth-value of PREDICATE[0](changed(DBcfg)) which has been False before doing this work is changed to True. For the remaining operation knowledge, similarly to the above, the definition can be made as follows.

```
OP_KNOWLEDGE rbtDB ={
    "reboot DB",
    "shutdown -r",
    {0},{1},{1},{ }}
OP_KNOWLEDGE chkDB ={
    "chkcfg DBcfg",
    "chkcfg DB.cfg",
    {0},{2},{2},{ }}
OP_KNOWLEDGE updNW ={
    "update NW",
    "Call NetworkExpert",
    { },{5},{5},{ }}
```

(3) Condition Knowledge

```
COND_KNOWLEDGE CN[0] ={
    {6},{ },{3},{ }}
```

In the definition of CN[0] described above, the condition knowledge in which, in the state where PREDICATE[6](satisfied(SLA)) has been established, enoughcap(DB) also might have been established, is expressed. For the remaining condition knowledge, similarly to the above, the definition can be made as follows.

```
COND_KNOWLEDGE CN[1] = {
    {1},{ },{2},{ } }
COND_KNOWLEDGE CN[2] = {
    {1},{ },{3},{ } }
COND_KNOWLEDGE CN[3] = {
    {6},{ },{4},{ } }
COND_KNOWLEDGE CN[4] = {
    {5},{ },{4},{ } }
COND_KNOWLEDGE CN[5] = {
    {3,4},{ },{6},{ }}
```

(4) Pre-Status and Post-Status Specified for Each Operation

Herein, it is assumed that, when the two operations cfgDB and rbtDB in the procedure pr are executed, the pre-status and the post-status of each operation are specified as follows.

```
SYSTEM_STATUS ss = {
    before_op[ ][ ] =
    { {F,F,F,F,T,F,F},
        {T,F,F,F,T,F,F} };
    after_op[ ][ ] =
        { {T,F,F,F,T,F,F},
            {T,F,F,F,T,F,F}};
}
```

The above specified data expresses that enoughcap(NW)=True before starting the execution of the first operation cfgDB, and after the execution of the first operation cfgDB has been finished, changed(DBcfg) also becomes True. Similarly, The above specified data expresses that after the execution of the second operation rbtDB has been finished, only enoughcap(NW) and changed(DBcfg) have been established.

5-3-2 Calculation Processing

There will be specifically described a flow until the output is generated, using the data indicated in the clause of 5-3-1 as the input.

(1) Derivation of Expected Post-Status

Herein, by the following processing, the predicates which are expected to be established before and after the execution of i-th operation are derived, and a sequence of status changes expected when the procedure has executed is derived.

The data structure internally held is as follows.

```
typedef struct {
    int[ ][ ] before_op_T;
    int[ ][ ] before_op_F;
    int[ ][ ] after_op_T;
    int[ ][ ] after_op_F;
} EXPECTED_STATUS;
```

For example, in the case in which the predicates represented by the numbers j and k are expected to have been established before the execution of the i-th operation, before_op_T[i][0]=j; and
before_op_T[i][1]=k.

Similarly, the predicate which is expected to be false before the execution of operation is registered in before_op_F. After the execution of operation, the predicates are registered in after_op_T and after_op_F, similarly.

To be specific, each status is derived by the following steps.

Stage 1: Initial Setting
EXPECTED_STATUS exp_st;

With regard to the above structure representing the expected status change, arrays after_op_T[0][ ] and after_op_F[0][ ] representing an initial status thereof are set as follows, based on the initial status in the defined system management procedure pr.

exp_st.after_op_T[0][x]=pr.premise_T[x];
exp_st.after_op_F[0][x]=pr.premise_F[x];

In the case example of clause 1-1, the following are obtained.

exp_st.after_op_T[0][ ]={4}
exp_st.after_op_F[0][ ]={3}

Stage 2: Creation of Pre-Status

The pre-status of the i−1 th operation is the sum of sets of the post-status of the i−1th operation and the pre-status of the i-th operation, and therefore, this is calculated as follows.

```
exp_st.before_op_T[i][ ] = {
    exp_st.after_op_T[i−1][ ],
    pr.operation[i−1]
        ->pre_cond_T[ ]};
exp_st.before_op_F[i][ ] = {
```

-continued

```
    exp_st.after_op_F[i-1][ ],
    pr.operation[i-1]
        ->pre_cond_F[ ]};
```

However, if the same number is included by two or more in exp_st.before_op_T[i][ ], those same numbers are brought into one. The similar processing is made on exp_st.before_op_F[i][ ].

In the case example of clause 1-1, when i=1, the system status expected before the execution of the 1st operation cfgDB is as follows.
exp_st.before_op_T[1][ ]={4};
exp_st.before_op_F[1][ ]={0,3};

Stage 3: Creation of Expected Post-Status

The post-statuses after_op_T[i][ ] and after_op_F[i][ ] are calculated as follows.

(a) A factor included in pr.operation[i]→post_cond_T[ ] is added to after_op_T[i][ ], and a factor included in pr.operation[i]→post_cond_F[ ] is added to after_op_F[i][ ].

(b) A factor which is included in before_op_T[i][ ] but is not included in after_op_F[i][ ] is added to after_op_T[i][ ]. Similarly, a factor which is included in before_op_F[i][ ] but is not included in after_op_T[i][ ] is added to after_op_F[i][ ].

(c) With regard to condition knowledge CN[j], in the case in which factors included in CN[j].if_T[ ] are all included in after_op_T[i][ ], and also, factors included in CN[j].if FH are all included in after_op_F[i][ ], CN[j].then_T[ ] is added to after_op_T[i][ ], and CN[j].then_F[ ] is added to after_op_F[i][ ].

In the case example of clause 1-1, when i=1, the system status expected after the execution of the 1st operation cfgDB is as follows.
exp_st.after_op_T[1][ ]={0,4};
exp_st.after_op_F[1][ ]={3};

Stage 4: Repetition

The calculation of the expected pre-statuses and post-statuses of all of the operations is repetitively performed until completion, with i++.

In the case example of clause 1-1, as a result, the following arrays are calculated.
exp_st.before_op_T[1][ ]={4};
exp_st.before_op_F[1][ ]={0,3};
exp_st.after_op_T[1][ ]={0,4};
exp_st.after_op_F[1][ ]={3};
exp_st.before_op_T[2][ ]={0,4};
exp_st.before_op_F[2][ ]={1,3};
exp_st.after_op_T[2][ ]={0,1,2,3,4,6};
exp_st.after_op_F[2][ ]={ };

(2) Judgment of Problems Based on the Comparison of the Actual Status of the System after the Execution of Operations with the Expected Post-Status If pr.operation[i-1]→post_cond_T[y]=z, and also, ss.after_op[i-1][z]=F, it is possible to judge that the target of the i-th operation could not be achieved (the same holds for the case of reversing T to F).

Furthermore, in the case of ss.after_op[i-1][z]=F even though z is included in exp_st.before_op_T[i][ ] and exp_st.after_op_T[i][ ], it is possible to judge that an unintended side effect occurs (the same holds for the case of reversing T to F).

In the case example of clause 1-1, when i=2, the following result is obtained. pr.operation[i-1 ]→post_cond_T[ ]={1}
ss.after_op[i-1][1]=F Therefore, it is possible to judge that the expected status change did not occur by the 2nd operation rbtDB (unachieved post-condition).

(3) Derivation of Sub-Goal Status

If the unachieved post-condition occurred, the difference between the expected post-status and the actual post-status is determined, and the sub-goal status sg for eliminating the difference is estimated.

```
typedef struct {
    int[ ][ ] sg_T;
    int[ ][ ] sg_F;
} SUB_GOAL;
SUB_GOAL sg[ ];
```

In the derivation of the sub-goal status, firstly, a set of the number z expressing the predicate which is consistent with both of the following two conditions is derived.

(a) (there is x which leads exp_st.after_op_T[i][x]=z, and also, ss.after_op[i-1][z]=F), or, (there is x which leads exp_st.after_op_F[i][x]=z, and also, ss.after_op[i-1][z]=T)

(b) (there is not y which leads pr.operation[i-1]→post_cond_T[y]=z and leads ss.after_op[i-1][z]=F), and also, (there is not y which leads properation[i-1]→post_cond_F[y]=z and leads ss.after_op[i-1][z]=T)

In the case example of clause 1-1, the set of z applying to the above is z[ ]={2,3,6}.

Then, candidates of the sub-goal status are calculated by adding a subset of the above z to the expected post-status in the i-th operation in which the problem has been caused. As the subset of z, there exist six patterns of {2},{3},{6},{2,3}, {3,6},{2,3,6}. Then, in each pattern, for z[j] leading exp_st.after_op_T[i][x]=z[j], z[j] and exp_st.after_op_T[i][ ] are added as factors of sg[ ].sg_T[ ], and for z[j] leading exp_st.after_op_F[i][x]=z[j], z[j] and exp_st.after_op_F[i][ ] are added as factors of sg[ ].sg_F[ ], so that the sub-goal status is estimated. However, in the case in which exp_st.after_op_T[i][x]=z[j], and also, z[j] is included in sg[ ].sg_F[ ], z[j] is eliminated (the same holds for the case of reversing T to F).

In the case example of clause 1-1, the post-status of the i-th operation is given as follows.
exp_st.after_op_T[1][ ]={0,4};
exp_st.after_op_F[1][ ]={3};

Therefore, regarding the above-mentioned six patterns, the sub-goals of six patterns as described below are created.
sg[0]={{0,4,2}, {3}};
sg[1]={{0,4,3}, { }};
sg[2]={{0,4,6}, {3}};
sg[3]={{0,4,2,3}, { }};
sg[4]={{0,4,3,6}, { }};
sg[5]={{0,4,2,3,6}, { }};

(4) Derivation of Sequence of Operations for Reaching the Sub-Goal Status

It is searched whether or not there are operations capable of reaching each of the sub-goal statuses derived in the above from the status expected after the execution of the i−1th operation. In this search, the following conditions are satisfied.

(a) Such a status inconsistent with each condition knowledge is not included. That is, in the case in which the factors included in CN[j].if_T[ ] are all included in sg[k].sg_T[ ] and also the factors included in CN[j].if_F[ ] are all included in sg[k].sg_F[ ], the factors included in CN[j].then_T[ ] are not to be included in sg[k].sg_F[ ] or the factors included in CN[j].then_F[ ] are not to be included in sg[k].sg_T[ ].

(b) The pre-condition of the operation being the candidate is not inconsistent with the expected post-status after the execution of the i−1th operation. That is, for the operation atop being the candidate, the factors included in alt_op.pre_cond_T[ ] are not to be included in exp_st.after_op_F[i−1][ ] or the factors included in alt_op.pre_cond_F[ ] are not to be included in exp_st.after_op_T[i−1][ ].

(c) In the case in which the operation being the candidate is executed in the expected post-status after the execution of the i−1th operation, the status as a result of the execution of the operation equals to the sub-goal status.

(d) The operations being candidates do not include the operation in which the problem has been caused.

When operations satisfying the above conditions are searched for all of the sub-goal statuses of sg[0]~sg[5], only for the sub-goal status sg[0], only the operation candidate chkDB for reaching this sub-goal status is detected.

Furthermore, in the case in which one operation connecting the expected status after the execution of the i−1th operation and the sub-goal status was unable to be derived, a plurality of operations are combined to thereby search a sequence of operations connecting the expected status after the execution of the i−1th operation and the sub-goal status. In this operation planning, it is possible to utilize the approach in the known technology as described above.

(5) Derivation of Alternative Operation Knowledge

When the operation capable of reaching the sub-goal status is derived, the pre-condition deemed to have been missing in the operation knowledge in which the problem has been caused is extracted based on a difference between the sub-goal status capable to be reached and the post-status of the i−1th operation, and the extracted pre-condition is added to the pre-condition of the alternative operation knowledge to be newly made up. To be specific, the factors which are not included in exp_st.after_op_T [i][ ] but are included in sg.sg_T[ ] are added to the pre-condition op.pre_cond_T of the operation knowledge op being an origin of alteration, and the factors which are not included in exp_st.after_op_F[i][ ] but are included in sg.sg_F[ ] are added to the pre-condition op.pre_cond_F thereof.

In the case example of clause 1-1, the operation in which the problem has been caused is rbtDB, and the setting thereof is as follows.

```
OP_KNOWLEDGE rbtDB ={
    "reboot DB",
    "shutdown -r",
    {0},{1},{1},{ }}
```

Then, new alternative operation knowledge rbtDB2, which is made by adding a difference {2} between exp_st.after_op_T[1][ ]={0,4} and sg[0].sg_T={0,4,2} to the pre-condition of rbtDB, is created as follows.

```
OP_KNOWLEDGE rbtDB2 ={
    *rbtDB,
    "reboot DB",
    "shutdown -r",
    {0,2},{1},{1},{ }}
```

(6) Derivation of Alternative System Management Procedure

When the alternative operation knowledge is derived, pr2 as the alternative system management procedure is derived from the defined system management procedure pr in accordance with the following procedure.

(a) The sequence of operations capable of reaching the derived sub-goal status is inserted before the i-th operation in which the problem has been caused in the system management procedure pr.

(b) The i-th operation in which the problem has been caused in the system management procedure pr is replaced with the derived alternative operations.

In the case example of clause 1-1, the system management procedure pr has been defined as follows.

```
PROCEDURE pr = {
    {*cfgDB, *rbtDB},
    {4},{3}
}
```

Contrary to the above system management procedure pr, pr2 described below is derived as the alternative system management procedure.

```
ALT_PROC pr2 = {
    {*cfgDB, *chkDB, *rbtDB2},
    {4},{3}
}
```

(7) Output of Result

Figure 9:
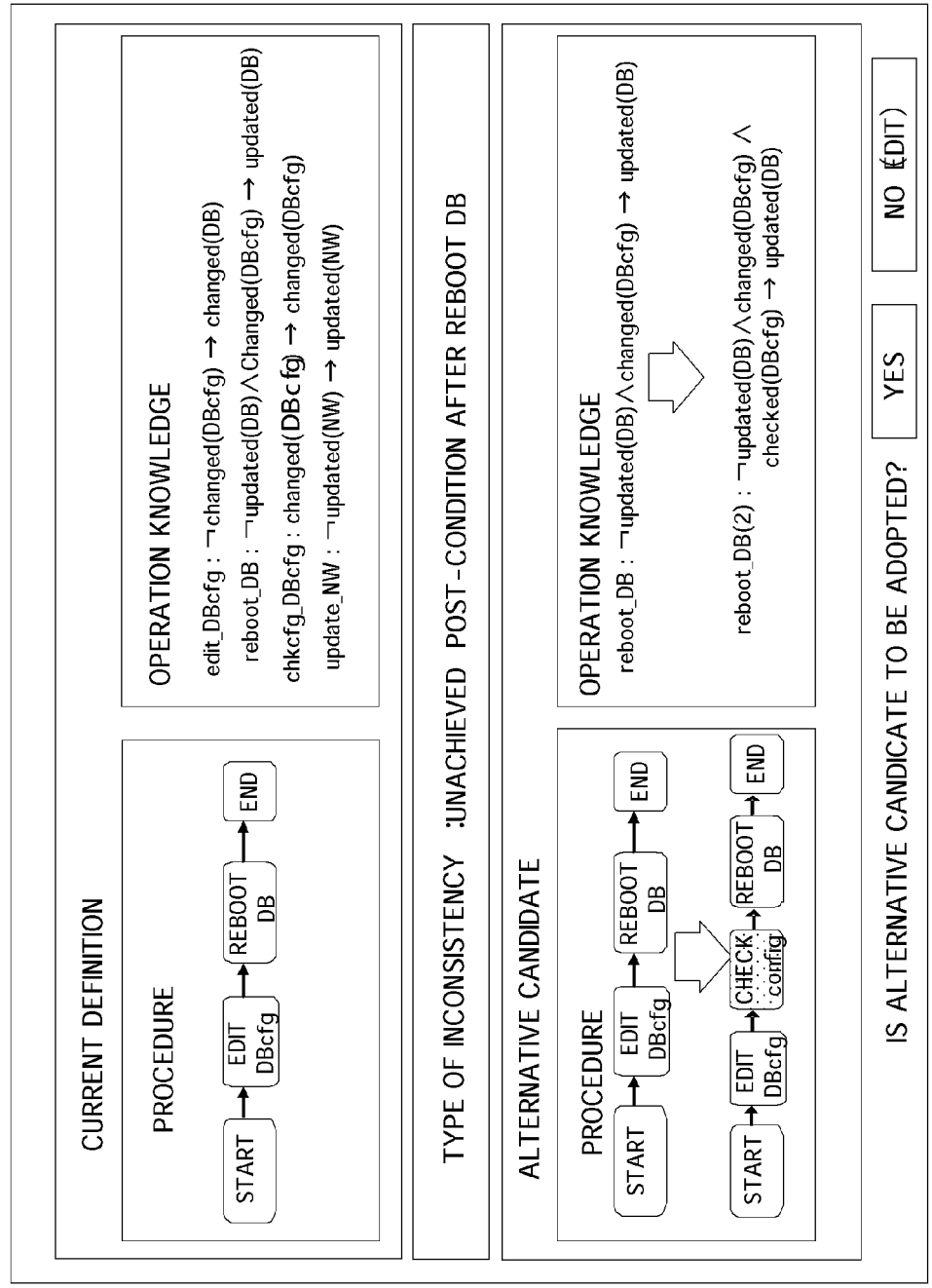
FIG. 9 is an explanatory diagram of a screen displaying the revising methods of the system management procedure and the operation knowledge.

When the above-mentioned alternative system management procedure and the alternative operation knowledge are derived, they are output to a screen. FIG. 9 illustrates a screen image displaying the alternative system management procedure and the alternative operation knowledge. On the screen, the definitions of the system management procedure and the operation knowledge, breakdown of inconsistency occurred after the execution of the system management procedure, and the alternative system management procedure and the alternative operation knowledge (revising methods) capable of eliminating the inconsistency are displayed.

The manager confirms the proposed alternative proposal, and judges whether or not the alternative proposal is to be reflected on the system management procedure DB 10A and the SKDB 10B. In the case in which the manager judges to reflect the alternative proposal, the contents of the original system management procedure pr and the original operation knowledge rbtDB (the definition of the sequence of operations, the definitions of the pre-condition and post-condition) are revised so as to be consistent with the contents of the alternative system management procedure pr2 and the alternative operation knowledge rbtDB2.

Furthermore, in the case in which the alternative proposal is in plural numbers, those alternative proposals are all proposed so that the manager can select the proper one.

Incidentally, in the present embodiment, it is supposed that the derived alternative system management procedure and the derived alternative operation knowledge are proposed to the manager, and the manager revises the system management procedure and the operation knowledge in the respective DBs based on the proposed contents. However, the present invention is not limited thereto. That is, in the present system operations management apparatus 10, a revising section may be further provided, so that the system management procedure DB10A and the SKDB 10B are directly and automatically updated. Thus, it is possible for the manager to save the step of revising the system management procedure and the operation knowledge in the respective DBs.

Furthermore, in the present embodiment, there has been described an example in which, when failure occurs, both of the alternative system management procedure and the alternative operation knowledge (revising methods), which are made by reflecting the revision on the system management procedure and the operation knowledge, respectively, are proposed as methods of proposing the revising methods capable of avoiding the failure. However, the present invention is not limited thereto. That is, only the revising method of the system management procedure may be proposed. Even in such a case, at least for the system management procedure, it is possible to prevent the same failure from recurring thereafter.

Furthermore, only the revising method of the operation knowledge may be proposed. Even in such a case, when the manager defines the new system management procedure, it becomes a matter for the manager to define the proper system management procedure capable of avoiding the same failure from recurring if the manager refers to the revised operation knowledge. Still further, it is possible to further perform the revision on the remaining system management procedures including the operation in which the problem has been caused, in order to prevent the same failure from recurring thereafter. Even still further, the system management knowledge relating to each operation is increased, so that the increased knowledge can be utilized in diverse ways, and consequently, it is possible to achieve systematic system operations management.

According to a system according to an embodiment of the embodiment, in the operations management of a computer system, as a result of the operations being executed in accordance with the system management procedure, when the failure occurs due to inconsistency between the actual status of the system and the expected post-condition thereof, the operations capable of avoiding this failure in this system management procedure are proposed. Therefore, if a manager revises the system management procedure so that the proposed operations are reflected on the system management procedure, it is possible for the manager to properly revise the system management procedure. Accordingly, even in a complicated system in which the respective constituent elements influence one another, the system management procedure can be properly revised so as to be consistent with the system status, and a failure that has once occurred can be avoided from recurring.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system operations management apparatus comprising:
    databases which store, respectively, a system management procedure made up of a plurality of operations for performing operations management on a computer system, and system management knowledge capable of specifying at least a post-status of each constituent element of the computer system, the post-status being expected as a result that the operations are executed in accordance with the system management procedure;
    judging means for judging that a failure occurs, when, as a result of the execution of operations in accordance with the system management procedure, an actual status of each constituent element of the computer system is inconsistent with the post-status specified based on the system management knowledge stored in the database;
    deriving means for, when it is judged by the judging means that failure occurred, deriving operations capable of making the actual status of the computer system as the result of the execution of operations in the system management procedure to be consistent with the specified post-status; and
    proposing means for proposing the operations derived by the deriving means,
    wherein the system management knowledge includes: operation knowledge including at least a pre-condition of each operation in the system management procedure, which is a premise for executing the operation and a post-condition to be satisfied at least in the constituent element which is an execution objective of the operation as the result of the execution of operation; and condition knowledge indicating a correlation to be necessarily satisfied in each constituent element of the computer system, and
    wherein the deriving means estimates a status in which at least a difference between the actual status of each constituent element after the execution of operation and the post-status of each constituent element is eliminated and the correlation indicated by the condition knowledge is satisfied, as a sub-goal status, and refers to the operation knowledge stored in the database to derive the operations capable of reaching the estimated sub-goal status.

2. A system operations management apparatus according to claim 1,
    wherein the deriving means further derives operation knowledge in which the post-condition is a condition satisfying the estimated sub-goal status, for the executed operation, and
    the proposing means further proposes the operation knowledge derived by the deriving means.

3. A system operations management apparatus according to claim 1,
    wherein the post-status is specified by reflecting a status change specified by a difference between the pre-condition in the operation knowledge and the post-condition therein in the operation, and also, by further reflecting the correlation indicated by the condition knowledge, in a status before the execution of operation in each constituent element which is the execution objective of the operation.

4. A system operations management apparatus according to claim 1,
    wherein the state in which the failure occurred is an unachieved post-condition state in which, although the status before the execution of operation satisfies the pre-condition, the actual status of the constituent element which is the execution objective of the operation does not satisfy the post-condition after the execution of operation.

5. A system operations management apparatus according to claim 1,
    wherein the state in which the failure occurred is an unexpected side effect state in which, although the status before the execution of operation satisfies the pre-condition and the status of the constituent element which is the execution objective of the operation satisfies the post-condition after the execution of operation, there is a constituent element of which status after the execution of operation is inconsistent with the post-condition.

6. A system operations management method comprising:
judging that a failure occurs, when, as a result of the execution of operations in accordance with a system management procedure stored in a database which is made up of a plurality of operations for performing operations management on a computer system, an actual status of each constituent element of the computer system is inconsistent with a post-status specified based on system management knowledge stored in the database which is capable of specifying at least the post-status of each constituent element of the computer system, the post-status being expected as a result that the operations are executed in accordance with the system management procedure;
deriving, when it is judged that the failure occurred, operations capable of making the actual status of the computer system as the result of the execution of operations in the system management procedure, to be consistent with the specified post-status; and
proposing the operations derived by the deriving,
wherein the system management knowledge includes: operation knowledge including at least a pre-condition of each operation in the system management procedure, which is a premise for executing the operation and a post-condition to be satisfied at least in the constituent element which is an execution objective of the operation, as the result of the execution of operation; and condition knowledge indicating a correlation to be necessarily satisfied in each constituent element of the computer system, and
wherein the deriving estimates a status in which at least a difference between the actual status of each constituent element after the execution of operation and the post-status of each constituent element is eliminated and the correlation indicated by the condition knowledge is satisfied, as a sub-goal status, and refers to the operation knowledge stored in the database to derive the operations capable of reaching the estimated sub-goal status.

7. A system operations management method according to claim 6,
wherein the deriving further derives operation knowledge in which the post-condition is a condition satisfying the estimated sub-goal status, for the executed operation, and
the proposing further proposes the operation knowledge derived by the deriving.

8. A system operations management method according to claim 6,
wherein the post-status is specified by reflecting a status change specified by a difference between the pre-condition in the operation knowledge and the post-condition therein in the operation, and also, by further reflecting the correlation indicated by the condition knowledge, in a status before the execution of operation in each constituent element which is the execution objective of the operation.

9. A system operations management method according to claim 6,
wherein the state in which the failure occurred is an unachieved post-condition state in which, although the status before the execution of operation satisfies the pre-condition, the actual status of the constituent element which is the execution objective of the operation does not satisfy the post-condition after the execution of operation.

10. A system operations management method according to claim 6,
wherein the state in which the failure occurred is an unexpected side effect state in which, although the status before the execution of operation satisfies the pre-condition and the status of the constituent element which is the execution objective of the operation satisfies the post-condition after the execution of operation, there is any constituent element of which status after the execution of operation is inconsistent with the post-condition, among each constituent element.

11. A computer readable, non-transitory medium storing a program causing a computer, which includes databases which store, respectively, a system management procedure made up of a plurality of operations for performing operations management on a computer system, and system management knowledge capable of specifying at least a post-status of each constituent element of the computer system, the post-status being expected as a result that the operations are executed in accordance with the system management procedure, to execute a process, the process comprising;
judging that a failure occurs, when, as a result of the execution of operations in accordance with system management procedure, an actual status of each constituent element of the computer system is inconsistent with the post-status specified based on the system management knowledge stored in the database;
deriving, when it is judged that the failure occurred, operations capable of making the actual status of the computer system as the result of the execution of operations in the system management procedure, to be consistent with the specified post-status; and
proposing the operations derived by the deriving,
wherein the system management knowledge includes: operation knowledge including at least a pre-condition of each operation in the system management procedure, which is a premise for executing the operation and a post-condition to be satisfied at least in the constituent element which is an execution objective of the operation, as the result of the execution of operation; and condition knowledge indicating a correlation to be necessarily satisfied in each constituent element of the computer system, and
wherein the deriving estimates a status in which at least a difference between the actual status of each constituent element after the execution of operation and the post-status of each constituent element is eliminated and the correlation indicated by the condition knowledge is satisfied, as a sub-goal status, and refers to the operation knowledge stored in the database to derive the operations capable of reaching the estimated sub-goal status.

12. A computer readable, non-transitory medium storing the program according to claim 11,
wherein the deriving further derives operation knowledge in which the post-condition is a condition satisfying the estimated sub-goal status, for the executed operation, and
the proposing further proposes the operation knowledge derived by the deriving.

13. A computer readable, non-transitory medium storing the program according to claim 11,
wherein the post-status is specified by reflecting a status change specified by a difference between the pre-condition in the operation knowledge and the post-condition therein in the operation, and also, by further reflecting the correlation indicated by the condition knowledge, in a status before the execution of operation in each constituent element which is the execution objective of the operation.

14. A computer readable, non-transitory medium storing the program according to claim 11,
wherein the state in which the failure occurred is an unachieved post-condition state in which, although the status before the execution of operation satisfies the pre-condition, the actual status of the constituent element which is the execution objective of the operation does not satisfy the post-condition after the execution of operation.

15. A computer readable, non-transitory medium storing the program according to claim 11,
wherein the state in which the failure occurred is an unexpected side effect state in which, although the status before the execution of operation satisfies the pre-condition and the status of the constituent element which is the execution objective of the operation satisfies the post-condition after the execution of operation, there is any constituent element of which status after the execution of operation is inconsistent with the post-condition, among each constituent element.

* * * * *